United States Patent
McClung

(10) Patent No.: US 10,569,343 B2
(45) Date of Patent: Feb. 25, 2020

(54) QUICK LOCKING AND RELEASING ATTACHMENT RETAINER

(71) Applicant: Ingersoll-Rand Company, Davidson, NC (US)

(72) Inventor: Mark T. McClung, Andover, NJ (US)

(73) Assignee: Ingersoll-Rand Company, Davidson, NC (US)

( * ) Notice: Subject to any disclaimer, the term of this patent is extended or adjusted under 35 U.S.C. 154(b) by 165 days.

(21) Appl. No.: 15/804,757

(22) Filed: Nov. 6, 2017

(65) Prior Publication Data
US 2019/0134793 A1    May 9, 2019

(51) Int. Cl.
| | | |
|---|---|---|
| *B23B 31/107* | (2006.01) | |
| *B23B 31/00* | (2006.01) | |
| *B25B 23/00* | (2006.01) | |

(52) U.S. Cl.
CPC ........ *B23B 31/1071* (2013.01); *B23B 31/003* (2013.01); *B25B 23/0035* (2013.01); *Y10T 279/17752* (2015.01); *Y10T 279/32* (2015.01); *Y10T 279/3481* (2015.01)

(58) Field of Classification Search
CPC ............... B23B 31/003; B23B 31/1071; Y10T 279/17726; Y10T 279/17752; Y10T 279/32; Y10T 279/3481
See application file for complete search history.

(56) References Cited

U.S. PATENT DOCUMENTS

| | | | | |
|---|---|---|---|---|
| 2,135,861 A | * | 11/1938 | Thompson | B23D 37/04 |
| | | | | 409/266 |
| 2,970,844 A | * | 2/1961 | Better | B23B 31/028 |
| | | | | 279/75 |
| 3,788,658 A | * | 1/1974 | Benjamin | B23B 31/06 |
| | | | | 279/75 |
| 4,577,875 A | * | 3/1986 | Miyakawa | B23B 31/06 |
| | | | | 279/155 |
| 5,050,467 A | | 9/1991 | Brown et al. | |
| 5,062,749 A | * | 11/1991 | Sheets | B23B 31/005 |
| | | | | 279/103 |
| 5,289,745 A | | 3/1994 | Beardsley | |
| 5,813,296 A | | 9/1998 | Hoff et al. | |
| 6,199,457 B1 | | 3/2001 | Hoff et al. | |
| 6,199,872 B1 | * | 3/2001 | Hasan | B23B 31/1071 |
| | | | | 279/155 |

(Continued)

Primary Examiner — Eric A. Gates
(74) Attorney, Agent, or Firm — Taft Stettinius & Hollister LLP

(57) ABSTRACT

An attachment retainer having a collar that, when at a collar locked position, has a first surface that is positioned above an open end of a passageway of a spindle to assist in retaining locking members in locking engagement with a driven tool. When in a collar release position, a second surface of the collar is positioned above the open end of the passageway to provide a space to receive a portion of the locking members so that the locking members can be disengaged from the driven tool. A plunger is displaceable to a position beneath another opening of the passageway to assist in retaining locking members in the passageway. A cam surface of a release ring can engage, and facilitate linear displacement of, release members as the release ring is rotated, which can facilitate axial displacement of the collar from the collar locked position to the collar release position.

16 Claims, 12 Drawing Sheets

(56) References Cited

U.S. PATENT DOCUMENTS

| | | | | |
|---|---|---|---|---|
| 6,325,393 B1* | 12/2001 | Chen | ............... | B25B 15/001 |
| | | | | 279/155 |
| 6,457,916 B2* | 10/2002 | Wienhold | ............ | B25B 15/001 |
| | | | | 279/155 |
| 6,637,755 B2* | 10/2003 | Chen | ............... | B25B 15/001 |
| | | | | 279/22 |
| 6,722,667 B2* | 4/2004 | Cantlon | ............. | B23B 31/06 |
| | | | | 279/155 |
| 6,874,791 B2* | 4/2005 | Chen | ............. | B23B 31/1071 |
| | | | | 279/14 |
| 6,953,196 B1* | 10/2005 | Huang | ............ | B23B 31/1071 |
| | | | | 279/155 |
| 6,966,562 B1* | 11/2005 | Wienhold | ........... | B23B 31/1071 |
| | | | | 279/155 |
| 6,966,730 B1* | 11/2005 | Miyanaga | ........... | B23B 31/1071 |
| | | | | 279/155 |
| 8,172,236 B2* | 5/2012 | Shibata | ............. | B25B 15/001 |
| | | | | 279/128 |
| 8,622,401 B2* | 1/2014 | Puzio | ............. | B23B 31/1071 |
| | | | | 279/30 |
| 9,381,627 B2* | 7/2016 | Chen | ............. | B25B 23/0035 |
| 9,561,581 B2 | 2/2017 | Chen et al. | | |
| 9,573,195 B2* | 2/2017 | Schneider | ........... | B23B 31/1071 |

\* cited by examiner

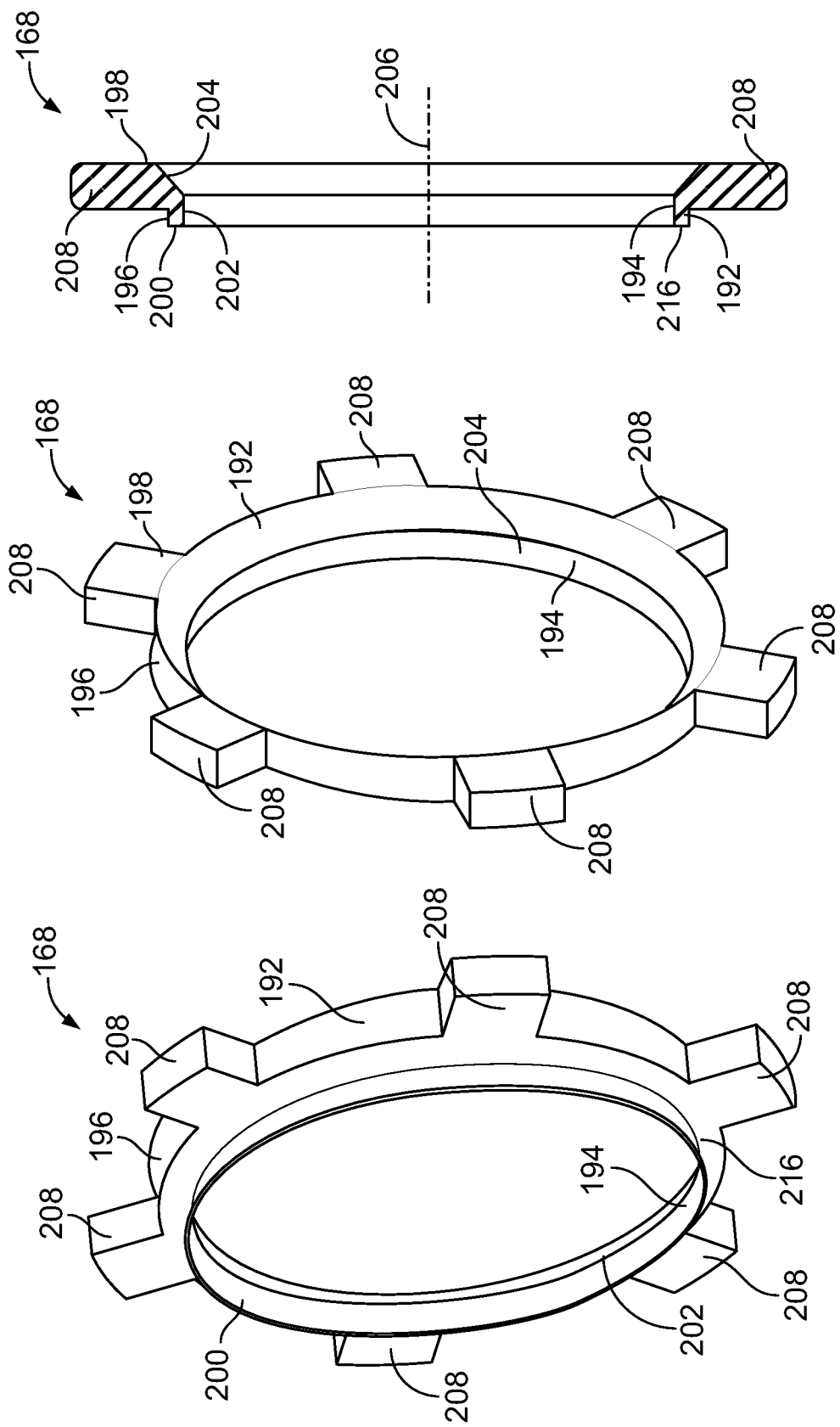

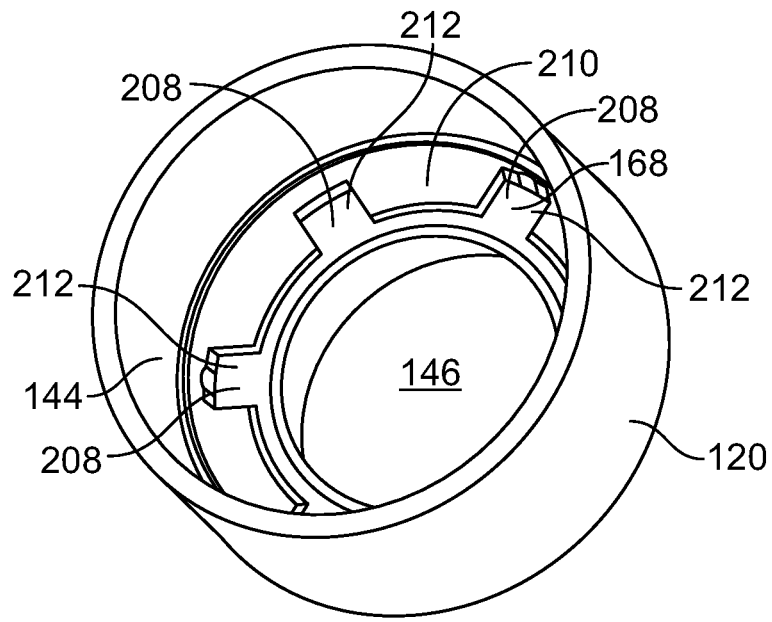
FIG. 7
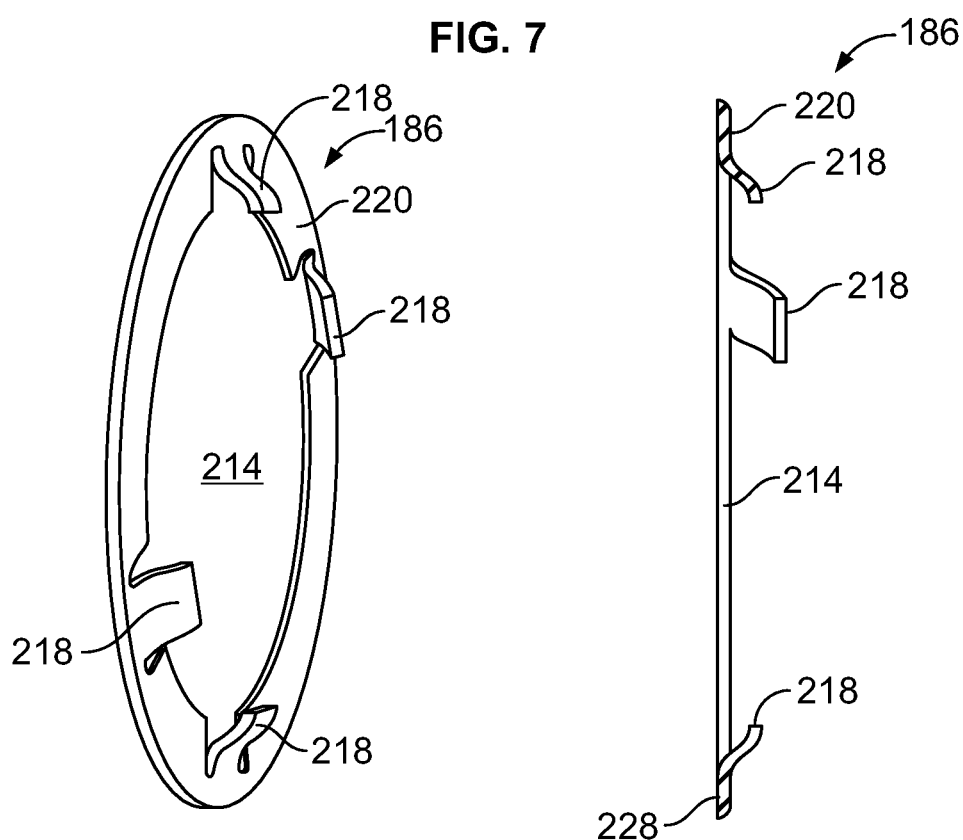
FIG. 8A      FIG. 8B

QUICK LOCKING AND RELEASING ATTACHMENT RETAINER

BACKGROUND

Embodiments of the present application generally relate to an attachment retainer. More particularly, but not exclusively, embodiments of the present application relate to an attachment retainer mechanism that can facilitate relatively quick locking and release of attachment components to/from a tool.

Socket attachments are utilized in a variety of different tools, including hand tools and power tools, for a variety of industries. Further, socket attachments can offer a degree of flexibility in at least terms of the interchangeability of the components that can be used with such tools in performing work. For example, socket attachments can offer a degree of interchangeability with respect to the size and type of components that can be selectively connected to the tool via the socket attachment in connection with using the tool to perform work on a workpiece or product. Further, socket attachments often allow for relatively fast connection and removal of such components to/from the tool.

One type of traditional socket attachment utilizes a compressible split friction member having an external outer size that is larger than a corresponding internal size of a mating feature, such as a size across a pair of flats of an internal square opening, of the socket. During attachment, the differences between the external outer size of the split friction member and the internal size of the mating feature of the socket can result in a compression of the split friction member that at least assists in securing the socket to at least the split friction member. Moreover, such compression can increase the friction between the split friction member and the socket to a level that can secure, and prevent the unintentional separation of, the socket to/from the split friction member. However, such designs can be relatively complex to manufacture, particularly in volume production where repeatability of relatively tight tolerances can be adversely impacted by manufacturing variations. For example, such designs often rely on relatively tight dimensional tolerances, such as, for example, in the size across the flats of an internal square of the mating feature. The failure to be within such tolerances can result in levels of friction that can adversely impact the ability to achieve, or maintain, friction levels that can operably secure engagement between at least the split friction member and the mating feature.

BRIEF SUMMARY

An aspect of an embodiment of the present application is a spindle having a cavity and a passageway, the passageway extending between a first end adjacent to an outer surface of the spindle and a second end adjacent to the cavity. The apparatus can further include a collar having an inner surface comprising a first surface and a second surface, the second surface being angularly offset from the first surface. Additionally, the collar can be axially displaceable about the outer surface of the spindle between a collar locked position at which at least a portion of the first surface is axially aligned with the first end of the passageway, and a collar release position at which at least a portion the second surface is axially aligned with the first end of the passageway. The apparatus can also include a plunger that is axially displaceable within the cavity of the spindle between a first plunger position at which the plunger is axially offset from the second end of the passageway, and a second plunger position at which at least a portion of the plunger is axially aligned with the second end of the passageway. Further, the plunger can be coupled to a plunger biasing element that is structured to bias the plunger toward the second collar position.

Another aspect of the subject application is an apparatus that includes a tool housing having a housing cavity and one or more holes, the one or more holes having one or more release members. Additionally a spindle having a passageway can be positioned within at least a portion of the housing cavity. The apparatus can further include a collar having an inner surface, the inner surface comprising a first surface and a second surface, the first surface being different than the second surface. The collar can be axially displaceable about an outer surface of the spindle between a collar locked position at which at least a portion of first surface is axially aligned with a first opening of the passageway, and a collar release position at which at least a portion of the second surface is axially aligned with the first opening of the passageway. Additionally, at least a portion of the collar can be positioned proximally adjacent to the one or more holes of the tool housing. The apparatus can also include a release ring that is rotably coupled to the tool housing. The release ring can have a cam surface that engages the one or more release members and which is structured to transmit a force that facilitates axial displacement of the one or more release members generally toward the collar as the release ring is selectively rotated from a release ring locked position to a release ring release position. Further, the one or more release members can be structured to transmit the force to the collar to facilitate axial displacement of the collar from the collar locked position to the collar release position.

Another aspect of the subject application is a method that includes rotating a release ring about a tool housing from a release ring locked position to a release ring release position. The rotation of the release ring to the release ring release position can facilitate axial displacement of at least a portion of one or more release members through one or more holes in the tool housing. Further, such axial displacement of the one or more release members can transmit a force to a collar that facilitates the axial displacement of the collar from a collar locked position on a spindle to a collar release position on the spindle. Moreover, when the collar is at the collar locked position, a first surface of an interior portion of the collar is axially aligned with a first opening of a passageway in the spindle, and when the collar is at the collar release position, a second surface of the interior portion of the collar is axially aligned with the first opening of the passageway. The method can also include displacing a portion of one or more locking members through the first opening of the passageway when the collar is displaced from the collar locked position to the collar release position.

BRIEF DESCRIPTION OF THE DRAWINGS

The description herein makes reference to the accompanying figures wherein like reference numerals refer to like parts throughout the several views.

FIGS. 6A and 6B illustrate front and back side perspective views, respectively, of a collar of the exemplary attachment retainer.

FIG. 6C illustrates a side cross sectional view of the collar depicted in FIGS. 6A and 6B.

FIG. 7 illustrates a rear perspective view of a tool housing matingly engaged with the collar that is depicted in FIGS. 6A-6C.

FIGS. 8A and 8B illustrate a front side perspective view and a cross sectional side view, respectively, of a collar biasing element according to an embodiment of the subject application.

Figure 1:
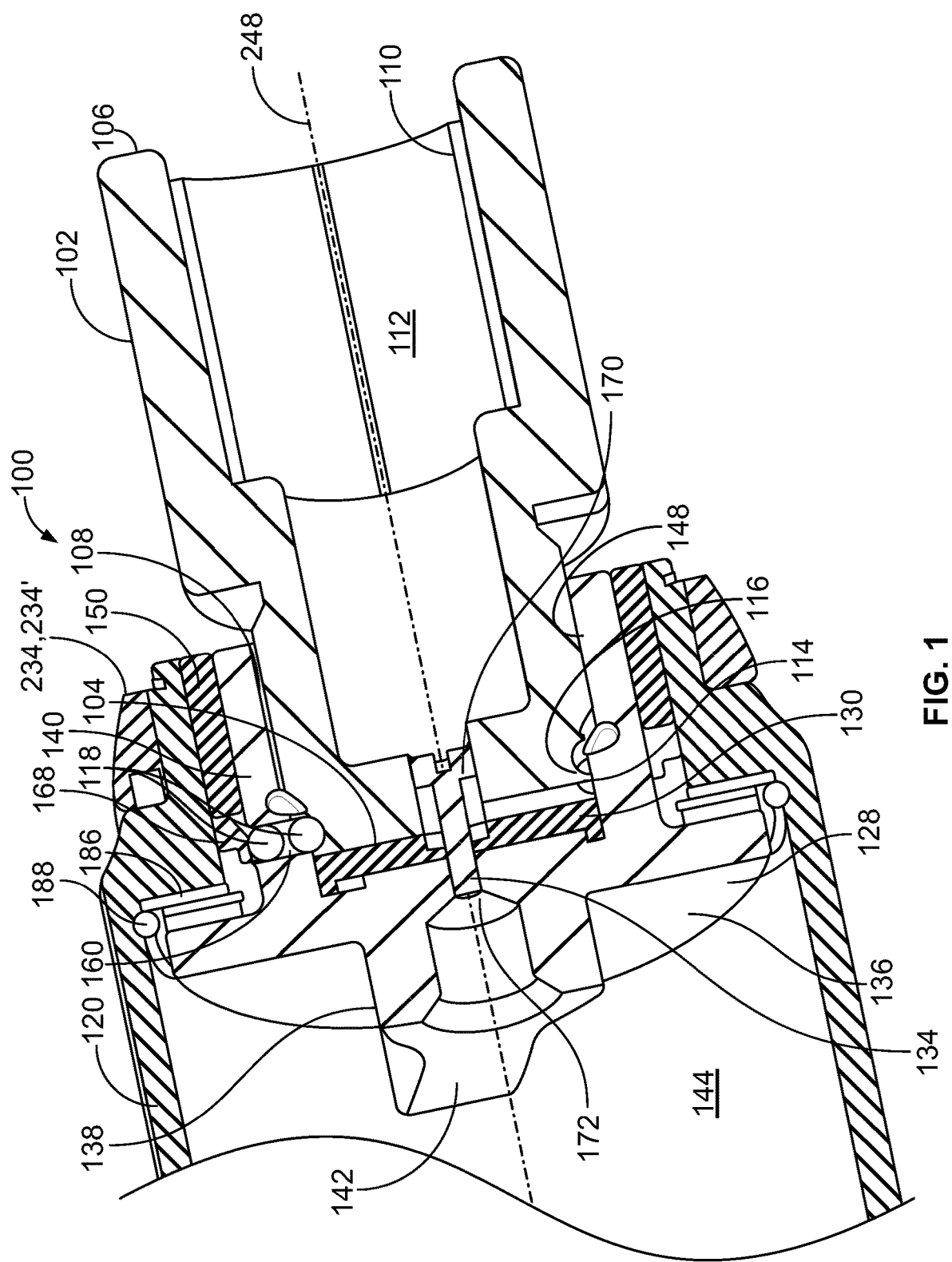
FIG. 1 illustrates a cross-sectional side view of an exemplary attachment retainer according to an illustrated embodiment of the present application.

The foregoing summary, as well as the following detailed description of certain embodiments of the present application, will be better understood when read in conjunction with the appended drawings. For the purpose of illustrating the application, there is shown in the drawings, certain embodiments. It should be understood, however, that the present application is not limited to the arrangements and instrumentalities shown in the attached drawings. Further, like numbers in the respective figures indicate like or comparable parts.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

Figure 2:
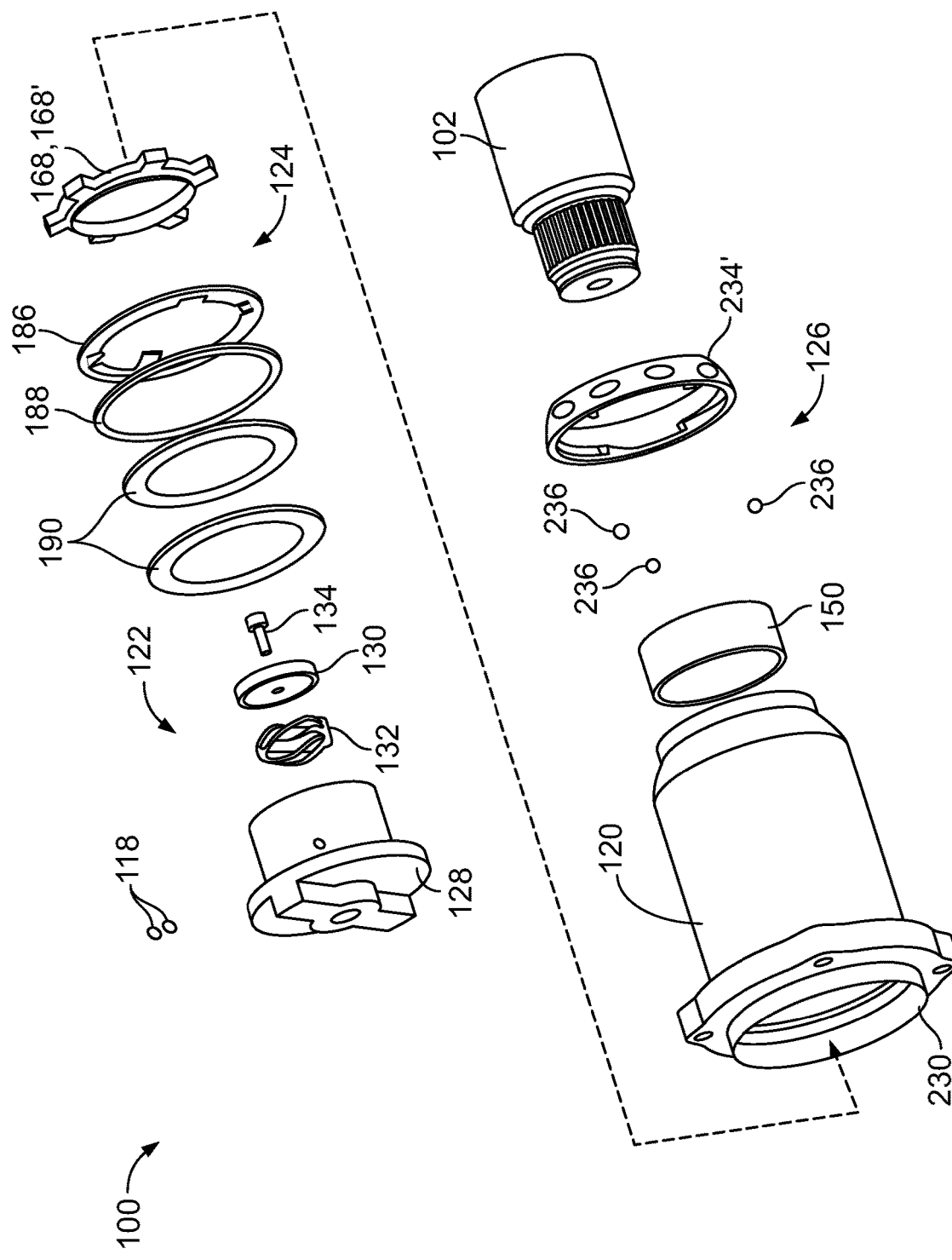
FIG. 2 illustrates an exploded perspective view of an exemplary attachment retainer according to an illustrated embodiment of the present application.

FIGS. 1 and 2 illustrate a cross-sectional side view and an exploded perspective view, respectively, of an exemplary attachment retainer 100 according to an illustrated embodiment of the present application. The illustrated attachment retainer 100 can be a portion of, or otherwise coupled to, a variety of different types of devices, mechanisms, and/or equipment. For example, according to certain embodiments, the attachment retainer 100 can be part of, or otherwise coupled to, a tool, such as, for example a hand tool and/or a power tool, including, but not limited to, a pneumatic, hydraulic, or electric power tool. Further, the attachment retainer 100 can be coupled to a variety of different types of such tools, including, for example, an impact wrench, drill, or air hammer, among other tools. Alternatively, the attachment retainer 100 can be a standalone device that is operably coupled to other equipment, such as, for example, coupled to an air hose that is attached to a compressor.

The attachment retainer 100 is configured for selective lockingly and releaseably coupling the attachment retainer 100 to an attachment, such as, for example, a driven tool 102, including, but not limited to, a socket(s), chisel, or drill bit, among other attachments or tools. As shown, for example, by at least FIGS. 3A and 3B, the driven tool 102 can extend between a first end 104 and an opposing second end 106. According to the illustrated embodiment, the driven tool 102 can include a first engagement portion 108 that can extend from, or from a location that is generally adjacent to, the first end 104 of the driven tool 102. The first engagement portion 108 can be structured for the transfer of power from the tool to which the attachment retainer 100 is part of, or coupled to, to the driven tool 102. For example, according to certain embodiments, the first engagement portion 108 can include a spline that is configured to operably engage the tool and/or the attachment retainer 100 in a manner that can transfer rotational power and/or torque therefrom to the driven tool 102. However, the first engagement portion 108 of the driven tool 102 can have a variety of other geometries that can facilitate the transfer of power from the tool and/or the attachment retainer 100 to the driven tool 102. For example, according to certain embodiments, the first engagement portion 108 can include a non-round shape, including, for example, a square or hexagonal shape, which matingly engages the associated tool and/or the attachment retainer 100. Further, although depicted in the illustrated embodiment as being an external feature, such as, for example an external spine, according to other embodiments, the first engagement portion 108 can be an internal feature, such as, for example, an internal spline, among other types of internal features and/or geometries.

According to certain embodiments, the second end 106 of the driven tool 102 can include a second engagement portion 110 that is configured to engage another component, including, but not limited to, a component of the workpiece or product, as well as the component or workpiece itself, upon which the tool is being used to perform work. For example, as shown by at least FIG. 3B, according to certain embodiments, the second engagement portion 110 can include an internal feature, such as, for example, a cavity 112 having a generally hexagonal shape that is configured to matingly engage a hexagonal shape of a bolt head. However, similar to the first engagement portion 108, the second engagement portion 110 can have a variety of other shapes and/or features configured to matingly engage another component upon which work is to be performed and/or which is utilized in connection with the associated tool performing work. Further, while the second engagement portion 110 is illustrated as being an internal feature, according to other embodiments, the second engagement portion can be an external feature, including, for example, an external bit feature that is sized for a mating engagement with a screw, bolt, pin, and/or setscrew, among engagement with other types of mechanical fasteners or mechanisms.

Figure 3A:
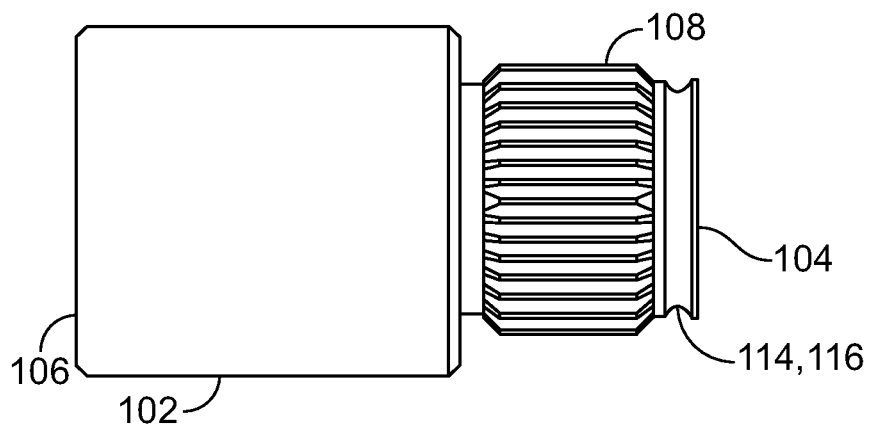
FIGS. 3A and 3B illustrate side and side perspective views, respectively, of an exemplary driven tool according to an illustrated embodiment of the present application.
Figure 3B:
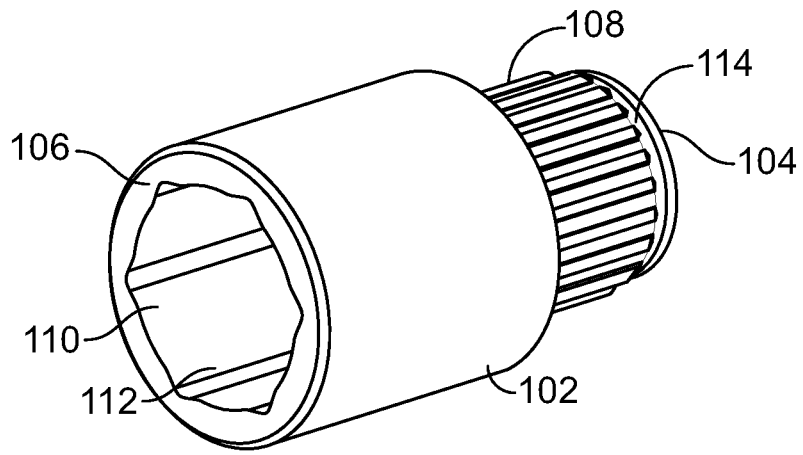

As shown in at least FIG. 3A, according to the illustrated embodiment, the driven tool 102 can include a groove or recess 114 that extends around an outer periphery of the driven tool 102. While the groove 114 can be positioned at a variety of locations about an exterior portion of the driven tool 102, according to the illustrated embodiment, the groove 114 is positioned generally adjacent to the first end 104 of the driven tool 102. Further, the groove 114 has a depth that is sized to receive one or more locking members 118, as discussed below. Further, while the groove 114 is depicted in at least FIG. 3A as having a curved bottom wall 116, the bottom wall 116 can terminate in a variety of other shapes. Additionally, according to certain embodiments, the bottom wall 116 can be configured to have a radius of curvature that is around, or larger than, a radius of a locking member 118, such as, for example, one or more locking balls, that can be received in at least a portion of the groove 114, as discussed below.

As shown by at least FIG. 2, the attachment retainer 100 can be operably coupled to a tool housing 120, such as, for example, a tool housing 120 of the associated tool to which the attachment retainer 100 is part of, or to which the attachment retainer 100 is otherwise coupled. As discussed below, according to certain embodiments the attachment retainer 100 can include a retention assembly 122, a collar assembly 124, and a release assembly 126.

Figure 9:
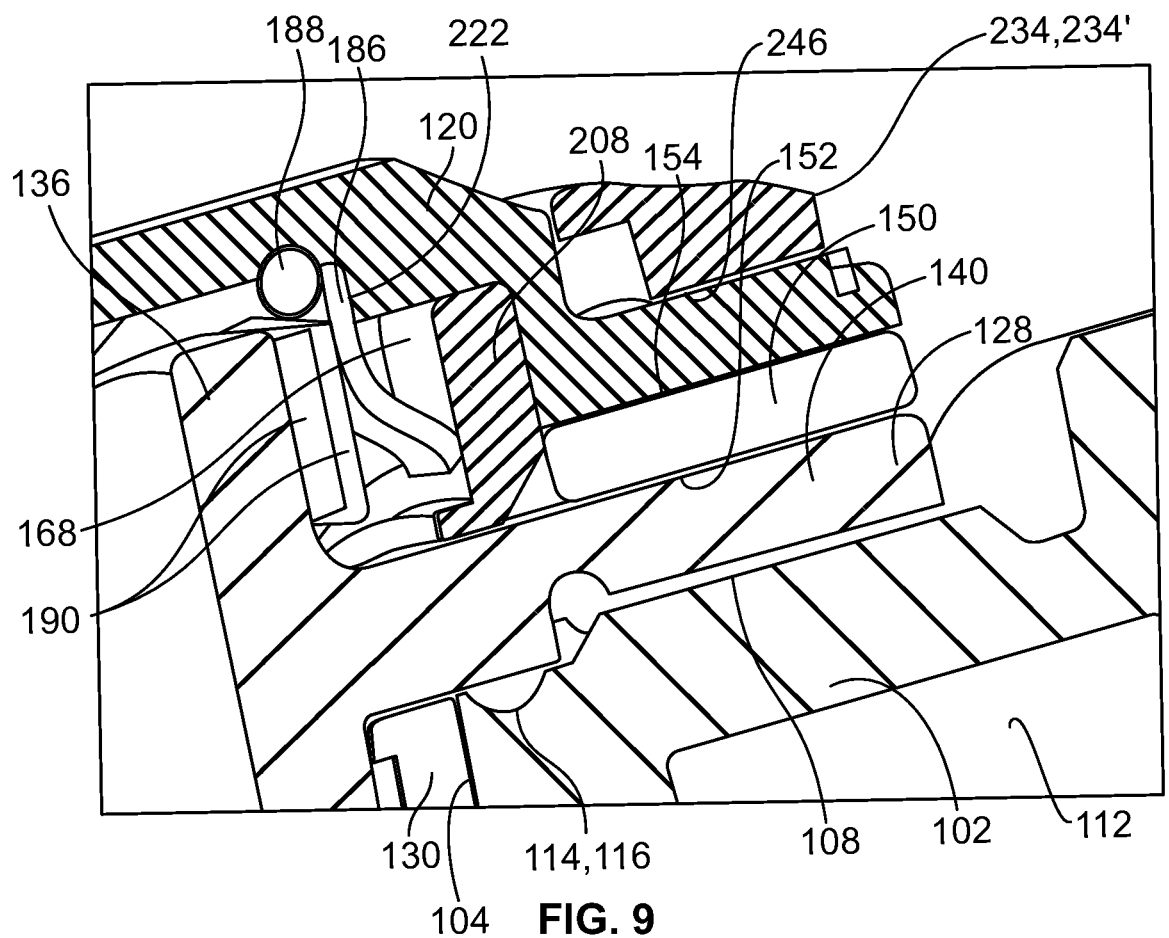
FIG. 9 illustrates a perspective, partial cross sectional view of a portion of an exemplary attachment retainer.

The retention assembly 122 can include a spindle 128, a plunger 130, a plunger biasing element 132, and a plunger fastener 134, as shown, for example, in at least FIGS. 1 and 9. According to certain embodiments, including, for example, embodiments in which the associated tool is an impact wrench, the spindle 128 can be an anvil. The spindle 128 can have a variety of shapes, configurations, and/or sizes. According to the illustrated embodiment, the spindle 128 includes a body portion 136, a first hub 138, and a second hub 140, the first and second hubs 138, 140 extending from opposing sides of the body portion 136. The first hub 138 can, according to the illustrated embodiment, include a key 142 or other feature that operably couples the spindle 128 to a power source that can facilitate displacement of the spindle 128. For example, according to the illustrated embodiment, the key 142 can be used in the transmission of rotational movement to at least the spindle 128.

As shown in at least FIG. 1, the spindle 128 can also have a size that accommodates operable placement of the spindle 128 within a housing cavity 144 in the tool housing 120. For example, according to certain embodiments, the body portion 136 of the spindle 128 can have an outer diameter that can accommodate at least rotational displacement of at least a portion of the spindle 128 within the tool housing 120. According to certain embodiments, the diameter of at least a portion of the housing cavity 144 of the tool housing 120 relative to the body portion 136 of the spindle 128 can also at least assist in limiting the radial movement, if any, of the spindle 128.

According to the illustrated embodiment, at least a portion of the second hub 140 can extend into a second cavity 146 of the housing cavity 144 of the tool housing 120, the second cavity 146 having a size, such as, for example, a diameter, that is smaller than the housing cavity 144 of the tool housing 120 and/or the outer size or diameter of the body portion 136. Further, at least a portion of the second hub 140 can include, or be coupled to, a spindle attachment portion 148 that is configured to matingly engage the first engagement portion 108 of the driven tool 102. Moreover, the spindle attachment portion 148 can matingly engage the first engagement portion 108 of the driven tool 102 in a manner that facilitates the transfer of power and/or movement of the spindle 128 to the driven tool 102. For example, according to certain embodiments, the spindle attachment portion 148 can be an internal spline that is positioned within a cavity 162 of the spindle 128 and which is structured to matingly engage a spline of the first engagement portion 108 that is positioned about an exterior of the driven tool 102. According to such an embodiment, at least rotational displacement of the spindle 128 can, via the engagement of the spindle attachment portion 148 and the first engagement portion 108, result in rotational displacement of the driven tool 102.

Figure 4:
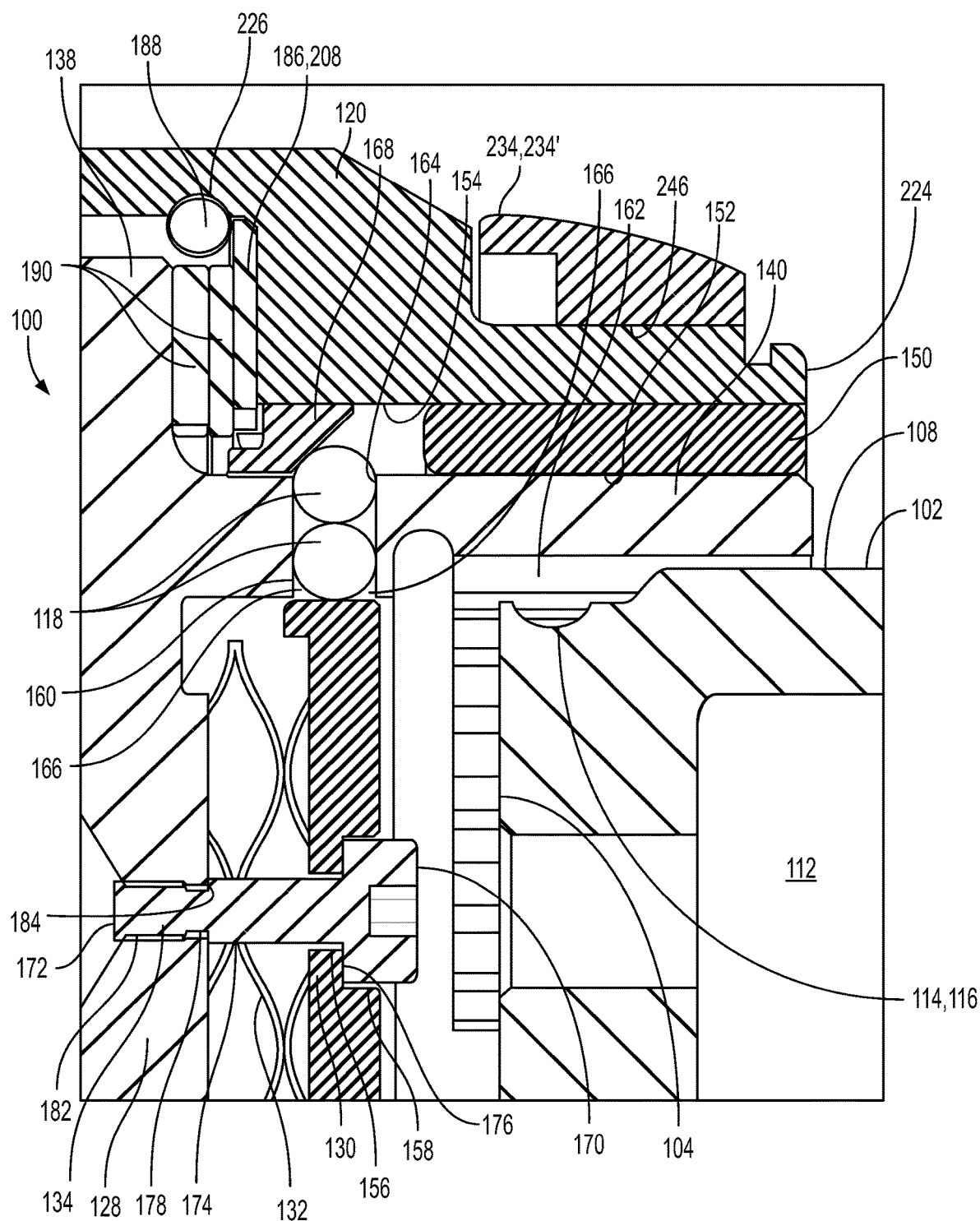
FIG. 4 illustrates a side cross sectional view of a portion of the exemplary attachment retainer coupled to a tool housing and in which a driven member is being inserted into, or removed from, the attachment retainer.

Referencing FIGS. 1, 2, and 4, according to certain embodiments, a bushing 150 can be positioned about an outer surface 152 of the second hub 140 of the spindle 128. Moreover, the bushing 150 can be positioned between the outer surface 152 of the second hub 140 of the spindle 128 and an inner surface 154 of the second cavity 146 (FIG. 7) of the tool housing 120. The bushing 150 can be secured to the tool housing 120 and/or spindle 128 in a variety of manners, including, for example, but not limited to, via a press fit, one or more retaining rings, and/or via a radial feature of the bushing 150.

As shown by at least FIGS. 1, 2, and 4, the spindle 128 can be coupled to a plunger 130, such as, for example, by a plunger fastener 134. According to the illustrated embodiment, the plunger 130 can have an outer surface that is sized for linear displacement within at least a portion of the spindle 128, such as, for example, at least a portion of the second cavity 146 of the second hub 140 of the spindle 128. Additionally, the plunger 130 can include an orifice 156 that extends through the plunger 130 and which has a size that can accommodate displacement of the plunger 130 relative to at least the plunger fastener 134, as discussed below. Further, according to the illustrated embodiment, as shown in FIG. 4, the orifice 156 of the plunger 130 can include a counter bore 158 that can at least assist in retaining the plunger 130 in engagement with the plunger fastener 134, as discussed below.

Figure 5:
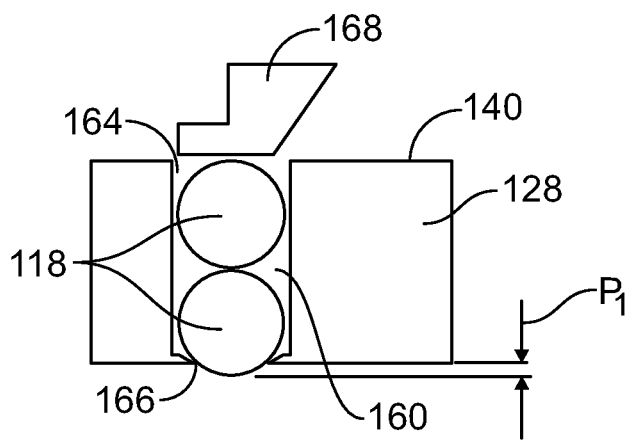
FIG. 5 illustrates a side cross sectional view of a portion of an attachment retainer in which a pair of locking members are retained within a passageway of a spindle and adjacent to a collar of the exemplary attachment retainer.

As shown by at least FIGS. 4 and 5, the spindle 128 can also include one or more passageways 160 that extend from an exterior surface of the spindle 128 to an interior portion, such as, for example, the cavity 162, of the spindle 128. For example, according to the illustrated embodiment, one or more passageways 160 can extend between a first opening 164 at an exterior surface of the second hub 140 and a second opening 166 at a cavity 162 of the second hub 140. The passageway 160 can be sized to receive insertion of one or more of the locking members 118, such as, for example, two locking balls. The number of locking members 118 in each passageway 160 can be based on a variety of different factors, including, for example, the height or width of the locking members 118 and/or the length of the passageway 160. In the illustrated embodiment, the passageway 160 contains two locking members 118 in the form of locking balls that can be constructed from a variety of materials, including, for example, steel. Additionally, the passageways 160 of the spindle 128 can be at a linear position(s) along the spindle 128, such as, for example, a linear distance from an end of the spindle 128, so that when the driven tool 102 is operably positioned for locking engagement with the attachment retainer 100, the groove 114 of the driven tool 102 is generally axially aligned with the passageway(s) 160, as discussed below. As also discussed below, such positioning can facilitate the passage of at least a portion of a locking member 118 from the passageway(s) 160 and into at least a portion of the groove 114 of the driven tool 102 so as to lockingly secure the driven tool 102 to at least the attachment retainer 100, as well as accommodate the retraction of at least a portion of the locking member 118 from the groove 114 and back into the passageway 160 when the driven tool 102 is to be released from at least the attachment retainer 100. Moreover, such an orientation can at least assist in maintaining at least a portion of the locking members 118 in the groove 114, and thus retain locking engagement of at least the spindle 128 with the driven tool 102, as the locking members 118 and passageway 160 are rotated with the spindle 128 during operation of the associated tool, and moreover, during operation of the associated tool using the attached driven tool 102.

According to certain embodiments, the first and second openings 164, 166 of the passageway(s) 160 can be sized to accommodate placement of one or more of the locking members 118 into the passageway 160, as well as, during certain modes of operation of the attachment retainer 100, the passage or protrusion of at least a portion of one or more of the locking members 118 from/through the first opening 164 or the second opening 166. Thus, for example, according to certain embodiments in which the locking members 118 are a pair of similarly size locking balls, the first and second openings 164, 166 can have sizes that are at least as large, if not larger, as the diameter of the locking balls. As discussed below, according to such embodiments, the locking members 118 may, during certain modes of operation, be radially constrained from leaving the passageway 160 through the first opening 164 by a collar 168 of the collar assembly 124. Further, as also discussed below, according to certain embodiments, the locking members 118 may, during different modes of operation, be radially constrained from leaving the passageway 160 through the second opening 166 by at least a portion of a plunger 130 and/or the driven tool 102 that is positioned beneath, or is generally axially aligned with, the second opening 166.

Alternatively, according to certain embodiments, the second opening 166 of the passageway 160 can be sized to allow a portion of the locking members 118 to protrude out from the passageway 160 through the second opening 166, while also sized to prevent the locking members 118 from being removed from the passageway 160 through the second opening 166. For example, according to certain embodiments, the second opening 166 can have a size, such as, for example, a diameter, that is smaller than the corresponding size, such as diameter, of the adjacent locking member 118. Thus, in the prior example in which the locking members 118 were locking balls, the second opening 166 can have a size, such as diameter, that allows the adjacent locking ball to protrude out from the passageway 160 at the second opening 166 by a protrusion length, as indicated for example by protraction length "$P_1$" in FIG. 5.

The plunger fastener 134 can have an axial length that can accommodate the plunger fastener 134 extending through at least the spindle 128 and the plunger 130. Further, the plunger fastener 134 can be configured to retain engagement with the spindle 128 and the plunger 130 while also accommodating linear displacement of at least one of the spindle 128 and the plunger 130 along, or relative to, at least a portion of the plunger fastener 134. Moreover, according to certain embodiments, the plunger fastener 134 is secured to spindle 128 and/or the plunger 130 in a manner that generally maintains the plunger fastener 134 in a generally static position relative to either the plunger 130 or the spindle 128. For example, according to certain embodiments, the plunger fastener 134 is a rivet that is secured to the spindle 128, and which is configured to accommodate linear displacement of the plunger 130 about a portion of the plunger fastener 134 as the plunger is displaced between a first plunger position and a second plunger position.

According to the illustrated embodiment, the plunger fastener 134 has a first end 170 and a second end 172. The first end 170 of the plunger fastener 134 can have an outer size, such as, for example, a diameter, that can be received within the counter bore 158, but not within the orifice 156, of the plunger 130. The plunger fastener 134 can include a first shaft 174 having an outer size, such as, for example, a diameter, that can be received in the orifice 156 of the plunger 130, as well as an axial length that can accommodate linear displacement of the plunger 130 along at least a portion of the first shaft 174. The transition between the outer size of the first end 170 and the first shaft 174 can provide a first shoulder 176 that at least assists in retaining the plunger 130 on the plunger fastener 134. Moreover, for example, the first shoulder 176 can be sized to engage a wall of the counter bore 158 in a manner that provides a barrier that at least assists in attempting to prevent at least the plunger 130 from being pulled off, or from, the plunger fastener 134 at the first end 170 of the plunger fastener 134.

According to the illustrated embodiment, the plunger fastener 134 can also extend into an orifice 178 the spindle 128. According to the illustrated embodiment, the orifice 178 of the spindle 128 can be in fluid communication with at least the cavity 162 of the spindle 128, such as, for example, in communication with the portion of the cavity 162 that extends through the second hub 140, as well as the portion of the cavity 162 of the first hub 138. According to such an embodiment, the plunger fastener 134 can include a second shaft 182 that has an outer size that is different than the outer size of the first shaft 174 and/or of the orifice 156 of the plunger 130. Thus, according to such embodiments, one of the first shaft 174 and the second shaft 182 can have an outer size that can accommodate placement in one, but not both, of the orifices 156, 178 of the plunger 130 and the spindle 128. For example, according to the illustrated embodiment, the outer size of the first shaft 174 can accommodate placement in the orifice 156 of the plunger 130, as well as linear displacement of the plunger 130 along at least a portion of the first shaft 174, but cannot accommodate placement of the first shaft 174 in the relatively smaller orifice 178 of the spindle 128. Moreover, according to certain embodiments, the plunger fastener 134 is a shoulder bolt that has an external thread along the second shaft 138 that is configured for threaded engagement with an internal thread in the orifice 178 of the spindle 128.

Alternatively, according to certain embodiments, the plunger fastener 134 and/or the spindle 128 can be configured to accommodate linear displacement of the plunger fastener 134 relative to at least the spindle 128. For example, as shown in FIG. 4, the orifice 178 of the spindle 128 can be sized relative to at least the outer size of the second shaft 182 so as to accommodate a degree of linear displacement of the second shaft 182 of the plunger fastener 134 through the spindle 128. The degree to which the plunger fastener 134 can be linearly displaced can be limited by differences in certain sizes between the plunger fastener 134 and the spindle 128. Moreover, such size differences can assist in maintaining the plunger fastener 134 operably engaged with the spindle 128. For example, according to the illustrated embodiment, differences in the outer sizes of the first and second shafts 174, 182 can result in the plunger fastener 134 having a second shoulder 184 at, or around, the transition between the first shaft 174 and the second shaft 182. The second shoulder 184 can extend to an outer size that is larger than the orifice 178 of the spindle 128, and thus, at least according to certain embodiments, limit the displacement of the plunger fastener 134 relative to the spindle 128. Further, according to certain embodiments, at least a portion of the second end 172 of the plunger fastener 134 can have an outer size that can accommodate at least a portion of the second end 172 being received in the spindle 128, but which cannot accommodate passage of the second end 172 through the orifice 178 of the spindle 128.

The plunger biasing element 132 is configured to bias the plunger 130 in at least an axial direction generally toward the passageway 160, and moreover, toward a second plunger position, as discussed below. According to the illustrated embodiment, the plunger biasing element 132 is a spring, which can be positioned between the spindle 128 and the plunger 130. As discussed below, according to certain embodiments, the plunger biasing element 132 can provide a biasing force that can assist in displacing the plunger 130 away from the spindle 128 when a driven tool 102 is being selectively released from the attachment retainer 100, as well as provide a force that assists in such release of the driven tool 102 from the attachment retainer 100.

The collar assembly 124 can include the collar 168, a collar biasing element 186, at least one retaining ring 188, and one or more thrust washers 190. The collar 168 includes a ring body 192 having an inner surface 194 and an outer surface 196, as well as opposing front and back surfaces 198, 200. The inner surface 194 of the collar 168 can have a first surface 202 and a second surface 204. The first surface 202 can extend from around the back surface 200 of the collar 168 to, or generally around, the second surface 204, the second surface extending to, or around, the front surface 198 of the collar 168. As shown by at least FIG. 6C, according to the illustrated embodiment, the second surface 204 has an outwardly extending tapered or conical configuration, while the first surface 202 has a generally cylindrical shape and/or is generally parallel to a central axis 206 of the collar 168.

The inner surface 194 of the collar 168 is sized to accommodate linear displacement of the collar 168 along at least a portion of the spindle 128, such as, for example, along the second hub 140. Further, the relative size of the inner surface 194 of the collar 168 and the portion of the spindle 128 about which the collar 168 is positioned can accommodate rotational displacement of the spindle 128 during operation of the associated tool while the collar 168 remains at a relatively stationary or static position. Such linear displacement of the collar 168 relative to the spindle 128 can facilitate one of the first surface 202 and the second surface 204 of the inner surface being selectively positioned at a location at which either the first surface 202 or the second surface 204 is generally axially aligned with, or directly over, the first opening 164 of the passageway 160 of the spindle 128 during different modes of operation of the attachment retainer 100. Further, as discussed below in more detail, the second surface 204 of the inner surface 194 of the collar 168 is shaped to accommodate, when the collar is at a collar release position such that the second surface 204 is at least generally axially aligned with, or directly over, the first opening 164, at least a portion of one of the locking members 118 protruding a distance from the first opening 164 of the passageway 160 of the spindle 128 during certain modes of operation of the attachment retainer 100, such as, for example, as a driven tool 102 is being inserted into, or removed from, the attachment retainer 100 such that the locking members 118 do not extend from the second opening 166 of the passageway 160 in a manner that could interfere with the linear displacement of the driven tool 102. The first surface 202 of the inner surface 194 of the collar 168 is shaped to at least assist in, when the collar is at a collar locked position such that the first surface 202 is generally axially aligned with, or directly over, the first opening 164, retaining the locking members 118 within the passageway 160 of the spindle 128 at least when the attachment retainer 100 is to be in locking engagement with the driven tool 102. Moreover, the first surface 202 has a shape and/or configuration to remain generally axially aligned with, or directly over, the first opening 164 of the passageway 160, as the spindle 128, and thus the passageway 160 and first opening 164, are rotated relative to the relatively stationary collar 168, 168' during operation of the associated tool, and moreover, during use of the driven tool 102 by operation of the associated tool. Thus, as shown for example by at least FIG. 5, when the first surface 202 is generally axially aligned with, or directly over, the first opening 164 of the passageway 160, the collar 168 can assist in preventing the locking members 118 from moving radially outwardly from the passageway 160.

The outer surface 196 of the collar 168 can include one or more features that can at least assist in attempting to prevent or minimize rotational displacement of the collar 168 during operation of the associated tool and/or the driven tool 102. According to certain embodiments the collar 168 includes one or more surface features that can mate with other features of the tool housing 120 and/or attachment retainer 100, among other components, that can at least attempt to prevent or minimize such rotational displacement. For example, according to certain embodiments, the collar 168 can include one or more protrusions 208 that can be shaped to be received in, or matingly engage, features of the tool housing 120. The number of such protrusions 208 can vary, and can include, for example, about three to about eight protrusions 208. As shown by at least FIG. 7, according to certain embodiments, an inner wall 210 of the tool housing 120 can include a plurality of recesses 212 that are positioned to matingly receive placement of at least a portion of the protrusions 208 of the collar 168, and which are sized to prevent and/or restrict rotational displacement of the protrusions 208, and thereby at least assist in preventing and/or minimizing rotational displacement of the collar 168 during operation of the associated tool, and moreover, while the spindle 128 and associated driven tool 102 are rotated. Further, the portions of the inner wall 210 of the tool housing 120 positioned between the recesses 212 can be sized to provide ample surface against which thrust washers 190 can bear against the collar 168. Such thrust washers 190 can be configured to resist axial loads that can be generated by operation of the spindle 128.

According to certain embodiments, the collar biasing element 186 can be structured to bias, or preload, the collar 168 to the collar locked position at which the first surface 202 of the inner surface 194 of the collar 168 is generally axially aligned with, or positioned over, the passageway 160 of the spindle 128. Additionally, the collar biasing element 186 can also be configured to provide a preload that can at least attempt to overcome and/or resist friction or load forces, such as, for example, pulling forces, when the driven tool 102 is lockingly secured to the attachment retainer 100 in a manner that seeks to prevent the driven tool 102 from being inadvertently released from the attachment retainer 100. Thus, such preloading forces can at least attempt to retain the first surface 202 of the inner surface 194 of the collar 168 generally in axial aligned with, or positioned directly over, the passageway 160 of the spindle 128.

According to certain embodiments, the collar biasing element 186 can be structured to contact, and exert a biasing force, against at least some, but not necessarily all, of the protrusions 208 of the collar 168. For example, as shown in FIGS. 8A and 8B, according to certain embodiments, the collar biasing element 186 can be a reed-type spring that is constructed from spring steel, among other materials. Further, the collar biasing element 186 can include an inner opening 214 that is sized to accommodate placement of the collar biasing element 186 around, for example, at least a portion of spindle 128, such as the second hub 140, and/or placement about at least a portion of the collar 168, including, for example, a hub 216 positioned on the back surface 200 of the collar 168. According to the illustrated embodiment, the collar biasing element 186 includes a plurality to spring fingers 218 that extend generally outwardly from the collar biasing element 186 and which are positioned and/or shaped to contact, and exert a biasing force against, at least some the protrusions 208 of the collar 168, as shown, for example, in at least FIG. 9. For example, as shown in FIGS. 8a and 8B, according to certain embodiments, the collar biasing element 186 can have four spring fingers 218, which can be fewer than the number of protrusions 208 of the collar 168.

The collar biasing element 186 can generally be axially retained in position within the attachment retainer in a variety of manners. For example, according to the illustrated embodiment, the front side 220 of the collar biasing element 186 can abut, or be generally adjacent to a shoulder 222 of the tool housing 120 that can prevent or limit axial displacement of the collar biasing element 186 in a direction generally toward a front end 224 of the tool housing 120. Additionally, a retaining ring 188 that is received in a groove 226 in the tool housing 120, and/or a thrust washer 190, can be positioned to abut, or be generally adjacent to, a backside 228 of the collar biasing element 186 so as prevent or limit axial displacement of the collar biasing element 186 in a direction generally toward a back end 230 of the tool housing 120.

Figure 10:
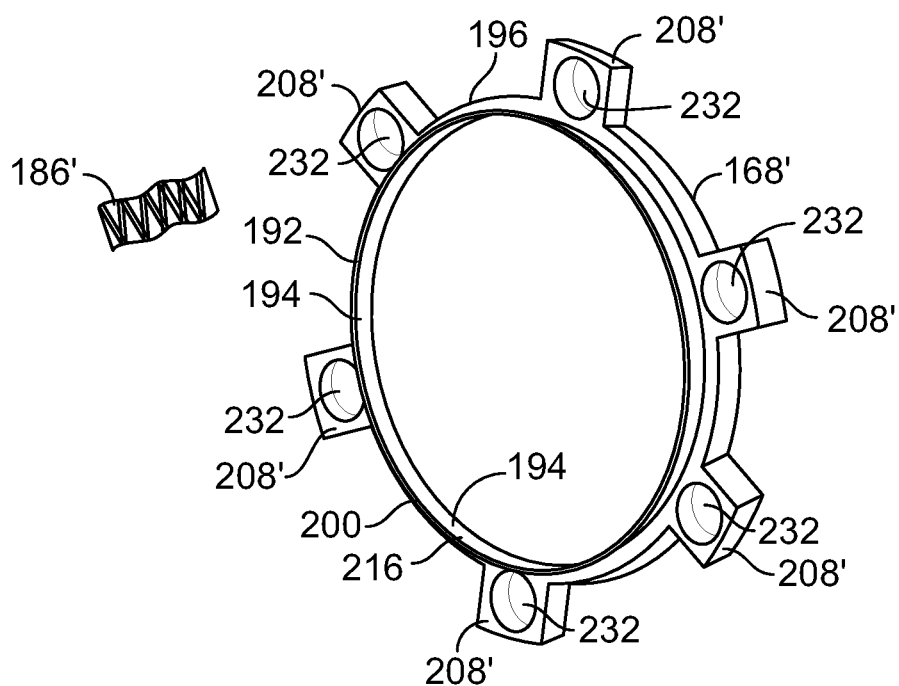
FIG. 10 illustrates a front side perspective view of another embodiment of a collar according to an embodiment of the subject application.

FIG. 10 illustrates a front side perspective view of a collar 168' according to an embodiment of the subject application that can utilize another type of collar biasing element 186'. More specifically, one or more of the protrusions 208' of the collar 168' depicted in FIG. 10 can be configured to matingly engage at least a portion of a collar biasing element 186', such as, for example, a wave spring, among other types of biasing elements. More specifically, according to the embodiment shown in FIG. 10, one or more of the protrusions 208 of the collar 168 can include a pocket 232 that is sized to receive placement of at least an end of the collar biasing element 186', such as an end of a wave spring. The pocket 232 can also be sized so as to create a fit with the collar biasing element 186' that secures the collar biasing element 186' to the pocket 232. According to such embodiments, the other, opposing end of the collar biasing element 186' can be positioned to engage another portion of the attachment retainer 100, such as, for example, a thrust washer 190.

As shown in at least FIGS. 1 and 11-14b, the release assembly 126 can also include a release ring 234, 234' and one or more release members 236. Additionally, as discussed below, according to the illustrated embodiment, the operation of the release assembly 126 can also utilize features of the tool housing 120.

Figure 11A:
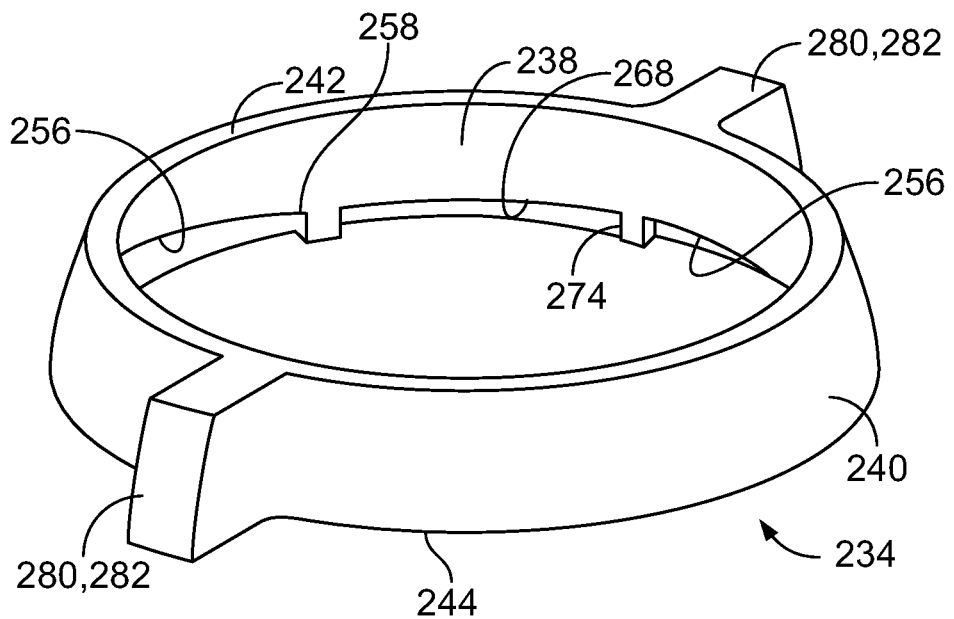
FIG. 11A illustrates a top side perspective view of a release ring according to an illustrated embodiment of the present application.
Figure 11B:
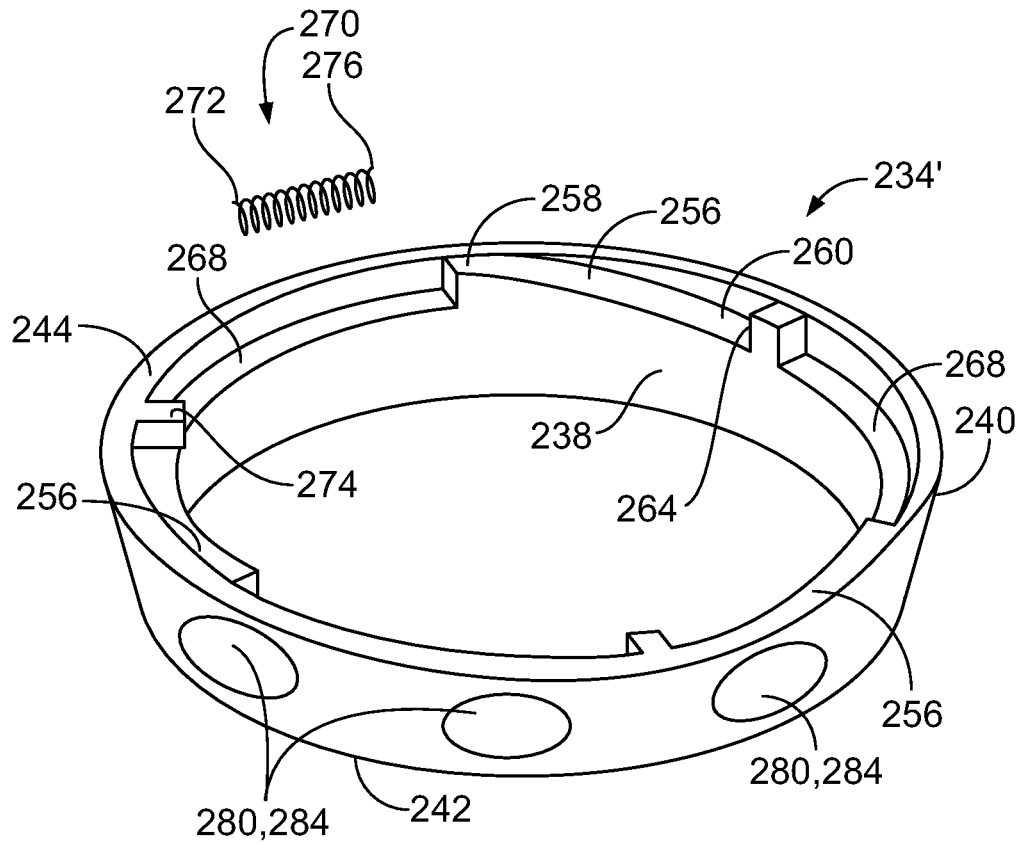
FIG. 11B illustrates a bottom side perspective view of a release ring according to an illustrated embodiment of the present application.
Figure 12:
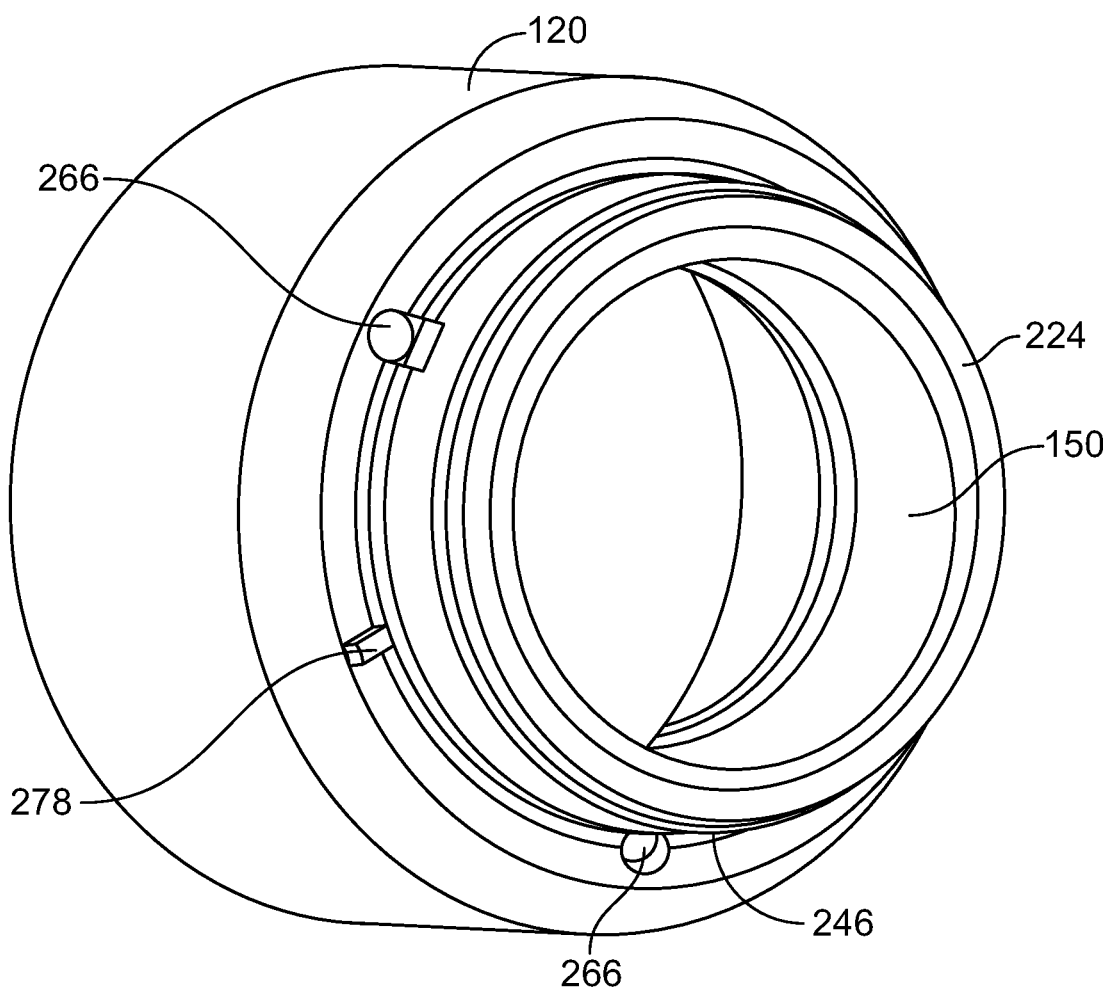
FIG. 12 illustrates a front side perspective view of a portion of a tool housing according to an illustrated embodiment of the present application.
Figure 13:
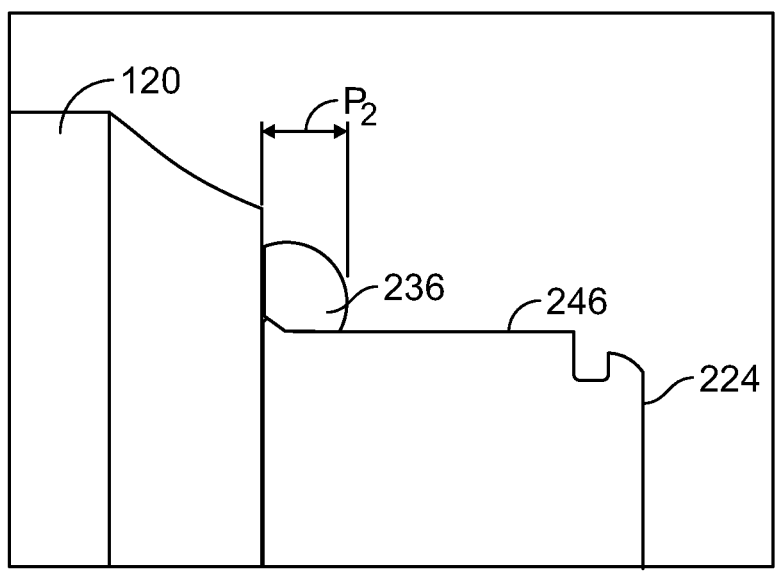
FIG. 13 illustrates a side view of a portion of both a tool housing and a release member according to an illustrated embodiment of the present application.

As shown in FIGS. 11A and 11B, according to certain embodiments, the release ring 234, 234' can include an inner portion 238 and an opposing outer portion 240, and can extend between a front side 242 and a back side 244. The inner portion 238 of the release ring 234, 234' has a size, such as, for example, a diameter, which accommodates the rotatable placement of the release ring 234, 234' about a portion of the tool housing 120, such as, for example, a hub. For example, according to certain embodiments, the inner portion 238 of the release ring 234, 234' is sized to accommodate rotatable placement of the release ring 234, 234' about an end hub 246 of the tool housing 120. In the illustrated embodiment, the release ring 234, 234' can be rotated about a central axis 248 (FIG. 1) of at least the tool housing 120 and/or the spindle 128. Further, the release ring 234, 234' can be secured to the tool housing 120 in a variety of different manners. For example, according to the illustrated embodiment, as shown in at least FIGS. 14A and 14B, the release ring 234, 234' can be securely positioned on the end hub 246 between an outer shoulder 250 of the tool housing 120 and a retainer 252, such as, for example, a retaining ring or clip, that is securely received in a recess 254 in the end hub 246 the tool housing 120.

The inner portion 238 of the release ring 234, 234' can also include one or recessed cam surfaces 256 having a first end 258 and a second end 260, and can generally face in the same direction, and generally have a similar radial orientation, as the back side 244 of the release ring 234, 234'. Further, the cam surfaces 256 can be inclined such that the second end 260 of the cam surface 256 is separated from the back side 244 of the release ring 234, 234' by a linear distance that is larger than the linear distance, if any, that the first end 258 of the cam surface 256 is separated from the back side 244 of the release ring 234, 234'. As discussed below, the inclined orientation of the cam surfaces 256 can assist in the axial displacement of one or more release members 236 into/from a cam pocket 262 formed at the second end 260 of the cam surface 256 and/or a position in a hole 266 of the tool housing 120, as shown, for example, in FIGS. 14A and 14B, as the release ring 234, 234' is rotated relative to the tool housing 120. The cam pocket 262 can be adjacent to a cam barrier or wall 264 that can assist in retaining the release member 236 in the cam pocket 262, and/or generally at the second end 260 of the cam surface 256, when the release assembly 126 is in the locked state.

Figure 14A:
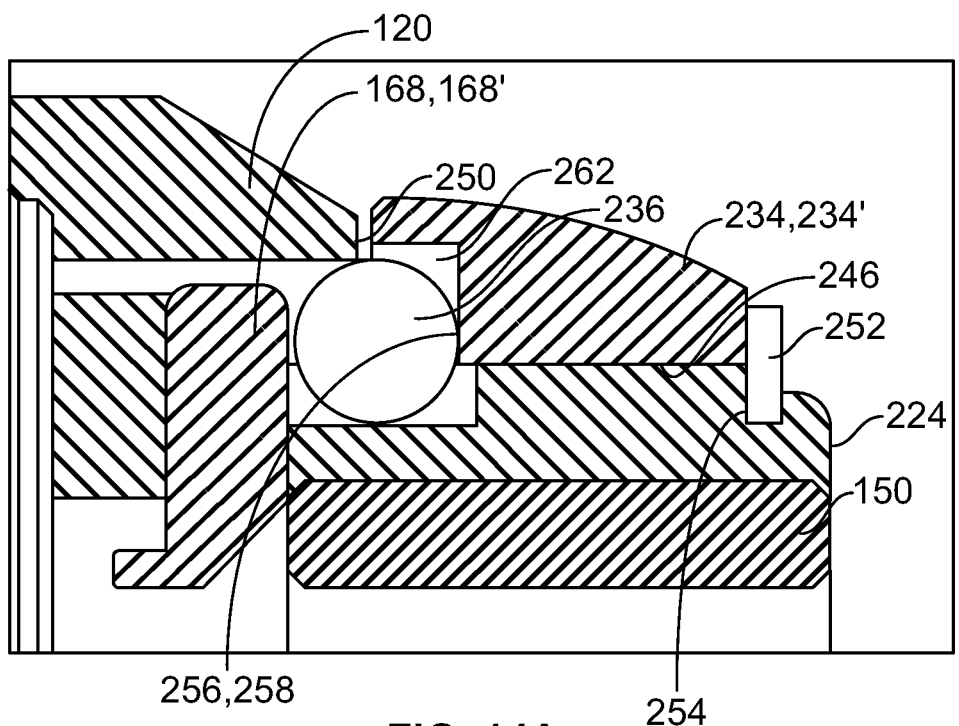
FIG. 14A illustrates a side cross sectional view of a portion of a release assembly of the illustrated attachment retainer that is in a locked state.

The inner portion 238 of the release ring 234, 234' can also include one or more biasing pockets 268 that are sized to receive placement of a ring biasing element 270 (FIG. 11B), including, but not limited to, a wire wound coil spring, among other types of springs. According to such an embodiment, each ring biasing element 270 can be used to exert a force that biases the release ring 234, 234' to a locked state, as shown in FIG. 14A, and as discussed below. According to the illustrated embodiment, a first end 272 of the ring biasing element 270 can be in operable contact with a wall 275 of the biasing pocket 268, and an opposing second end 276 of the ring biasing element 270 can be in operable contact with a generally stationary tab 278 (FIG. 12) on the tool housing 120. Additionally, according to such an embodiment, in addition to at least assisting in securing the rotational placement of the release ring 234, 234' about the end hub 246 of the tool housing 120, the retainer 252 can also be sized to overcome spring forces that the retainer 252 may encounter, or which can be transmitted from, relating to the collar biasing element 186, 186' and/or the ring biasing element 270.

According to certain embodiments, the outer portion 240 of the release ring 234, 234' can include one or more grip members or features 280 that can assist the operator in securely grasping or engaging the release ring 234, 234' in connection with the release ring 234, 234' being operably rotated about the end hub 246 about, or relative to, the tool housing 120. For example, according to the embodiment depicted in FIG. 11A, the release ring 234 can include one or more outwardly extending protrusions 282 that can facilitate single finger actuation of the release assembly 126 and/or rotation of the release ring 234. Alternatively, or additionally, according to certain embodiments, the grip member 280 can be a plurality of grip divots 284, as shown for example in FIG. 11B.

As shown in at least FIGS. 12-14B, the holes 266 in the tool housing 120 are sized to accommodate linear displacement of the release members 236. The number of holes 266 in the housing 120 can vary. For example, according to certain embodiments, the tool housing 120 can have above three holes 266. Further, similar to the locking members 118, the release members 236 can take a variety of shapes and sizes, including, for example, being generally circular steel balls. Additionally, while FIGS. 12-14B illustrate a single release member 236 in each hole 266, the number of release members 236 each hole can be more than one, and can vary for different holes 266. According to the illustrated embodiment, the holes 266 are positioned at one or more locations at which at least a portion of the release member 236 can be in contact with a protrusion 208 of the collar 168. Moreover, for example, according to the illustrated embodiment, the holes 266 can each be in communication with a recess 212 (FIG. 7) of the tool housing 120 such that, when a protrusion 208 of the collar 168 is in the recess 212, a release member 236 in the hole can be, or can come into, contact with that protrusion 208.

FIG. 14A depicts the position of at least a portion of the release assembly 126 when the release assembly 126 is in the locked state, including, for example, when the driven tool 102 is lockingly engaged with the attachment retainer 100. As illustrated by FIG. 14A, when the release assembly 126 is in its locked state, the collar 168 is at a first position at which the protrusions 208 of the collar 168 exert a force against an adjacent release member 236 that causes the release member 236 to be moved to, and/or retained at, a position at which at least a portion of the release member 236 protrudes out from the hole 266 of the tool housing 120, as shown, for example, by at least FIGS. 13 and 14A. Further, as shown by FIG. 14A, when the release assembly 126 is in the locked state, the release ring 234, 234' is at a release ring locked position at which at least a portion of the release members 236 are positioned in the cam pocket 262, which according to the illustrated embodiment is at the second end 260 of the cam surface 256 of the release ring 234, 234'. Additionally, as discussed below, when the release assembly 126 is in the locked state, the first surface 202 of the inner surface 194 of the collar 168 is adjacent to, or directly above, the first opening 164 of the passageway 160, thereby restraining the locking members 118 at a radial location within at least a portion of the passageway 160, and the groove 114 of the driven tool 102 that lockingly secures the driven tool 102 to the attachment retainer 100. Moreover, the first surface 202 of the inner surface 194 of the collar 168 can be configured to at least assist in retaining the locking members 118 within the passageway 160 while the passageway 160 and locking members 118 are rotated relative to the relatively stationary collar 168 via rotation of the spindle 128 during operation of the associated tool. Further, as previously discussed, the collar 168 can be biased to its locked position by the collar biasing element 186.

Figure 14B:
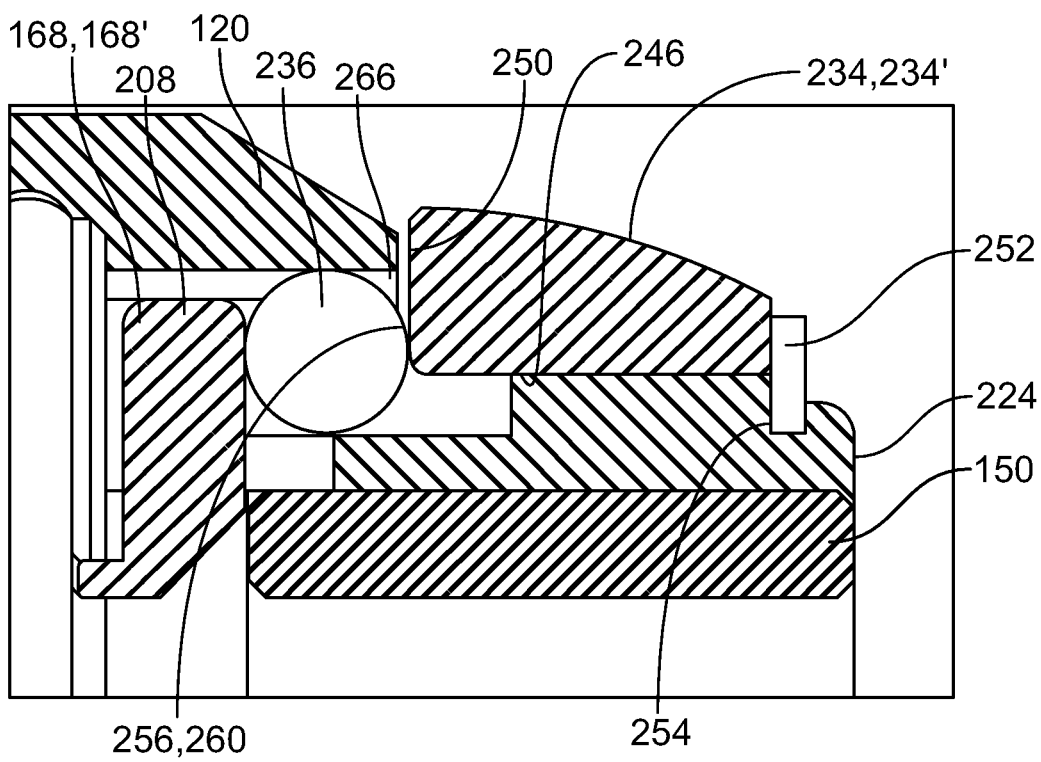
FIG. 14B illustrates a side cross sectional view of a portion of a release assembly of the illustrated attachment retainer that is in an release state.

FIG. 14B depicts the position of at least a portion of the release assembly 126 when the release assembly 126 is in the release state, including, for example, when the driven tool 102 is not lockingly engaged with the attachment retainer 100. As illustrated by FIG. 14B, when the release assembly 126 is in its release state, the release ring 234, 234' is at a release ring release position about the tool housing 120 such that a first end 258 of the cam surface 256 is in contact with, or adjacent to, the release member 236. Thus, as illustrated by FIG. 14B, with the first end 258 of the cam surface 256 being positioned adjacent to the release member 236, the release member 236 does not protrude, if at all, from the hole 266 of the tool housing 120 to the same degree as when the release assembly 126 is in the locked state (FIG. 14A). Thus, according to the illustrated embodiment, the transition of the release assembly 126 from the locked state to the release state includes axially displacing the release member 236 generally in the direction toward the collar 168. Further, such axial displacement of the release member(s) 236 can facilitate similar axial displacement of the collar 168 relative to at least the spindle 128 and/or the tool housing 120. Moreover, such displacement of at least the release member 236, and the associated forces, can directly or indirectly facilitate the displacement of the collar 168 from a collar locked position relative to the spindle 128 at which the first surface 202 of the inner surface 194 of the collar 168 is directly over, or adjacent to, the first opening 164 of the passageway 160 of the spindle 128, to the collar release position relative to the spindle 128 at which the second surface 204 of the inner surface 194 of the collar 168 is generally axially aligned with, or directly over, the first opening 164 of the passageway 160. Further, according to certain embodiments, the distance the collar 168 is axially displaced from the collar locked position to the collar release position via the release assembly 126 being moved from the locked state (FIG. 14A) to the release state (FIG. 14B) can generally be about the same as the distance that the release member protrudes from the hole 266 of the tool housing 120 (as indicated by "$P_2$" in FIG. 13) when the release assembly 126 is in the locked state.

Figure 15A:
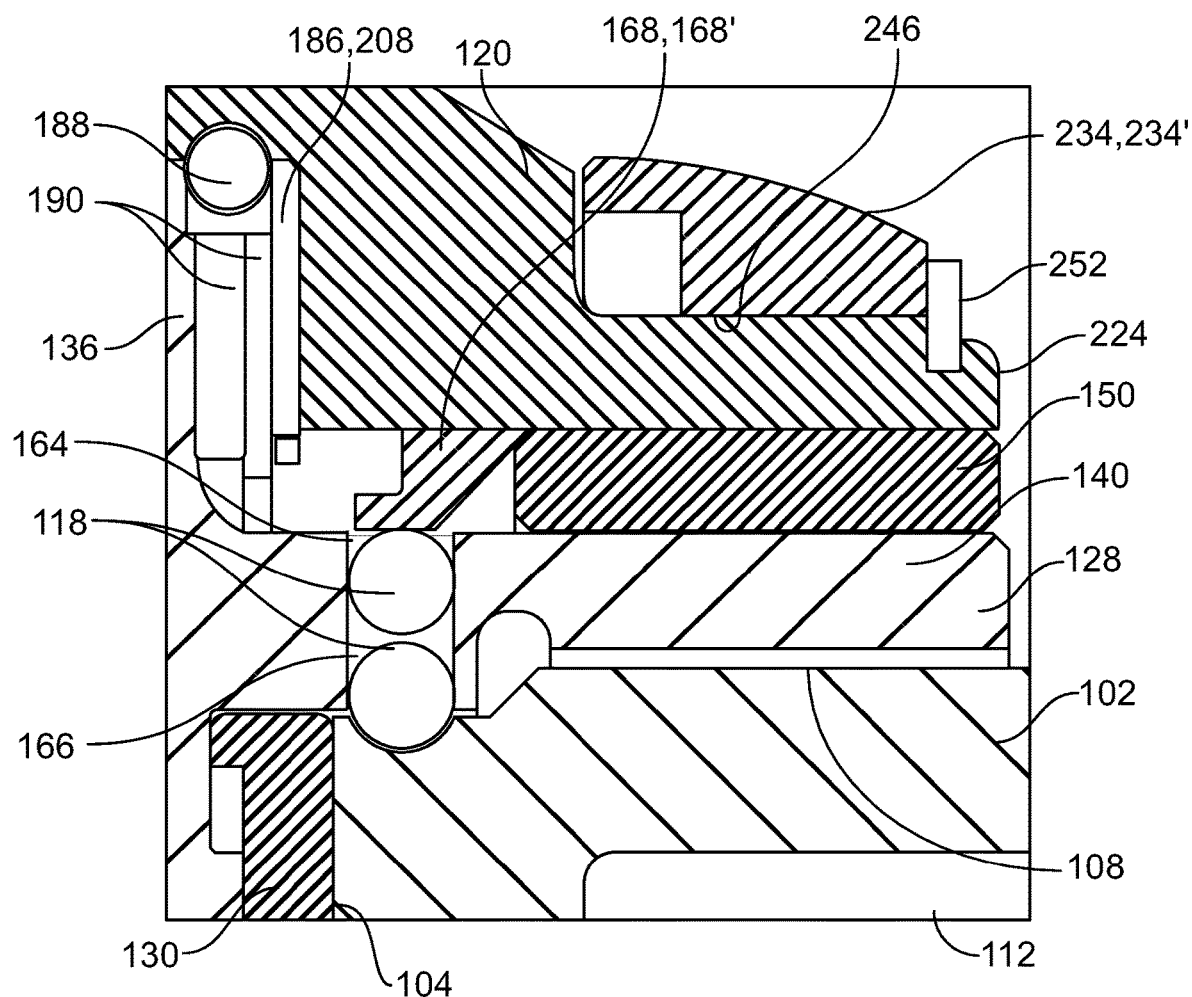
FIG. 15A illustrates a side cross sectional view of a portion of the illustrated attachment retainer in a locked position.

FIGS. 1 and 15A depict a driven tool 102 lockingly secured to the illustrated embodiment of the attachment retainer 100. Although the views of FIGS. 1 and 15A do not depict the release members 236, the release assembly 126 is indicated to be in the locked position, similar to that depicted in FIG. 14A, as indicated for example by the collar 168 being at a collar locked position at which the first surface 202 of the inner surface 194 of the collar 168 is positioned directly above the passageway 160 of the spindle 128. Further, as previously discussed, with the release assembly 126 in the locked state, the release ring 234, 234' can be biased by the ring biasing element 270 so that the cam pockets 262 of the release ring 234, 234' are positioned to accommodate at least the protrusion of at least a portion of an adjacent release member 236, if present, from a hole 266 in the tool housing 120, as also depicted at least in FIG. 14A.

As shown by at least FIGS. 1 and 15A, with the driven tool 102 lockingly secured to the attachment retainer 100, the locking members 118 are positioned to prevent or minimize the linear displacement of the driven tool 102 relative to at least the spindle 128. Moreover, at least portions of the locking members 118 can extend between the groove 114 of the driven tool 102 and the passageway 160 of the spindle 128 so that portions of the locking members 118 are positioned at a location at which the locking member 118 interferes, or prevents, the driven tool 102 from being separated from the spindle 128. For example, according to certain embodiments, portions of one or more of the locking members 118 can be positioned in both the passageway 160 and the groove 114 so as to extended to a location between the spindle 128 and the driven tool 102 that allows the locking member 118 to inference with, or provide a barrier to, the axial displacement of the driven tool 102 relative to the spindle 128.

According to the illustrated embodiment, when the driven tool 102 is to be released from locking engagement with the attachment retainer 100, an operator can exert a rotational force against the release ring 234, 234', such as, for example, by exerting a force using a grip member 280, including a protrusion(s) 282 and/or the grip divot(s) 284, that imparts a rotational force on the release ring 234, 234' that overcomes at least the biasing force of the ring biasing element 270. As the release ring 234, 234' is rotated, the cam surface 256 of the inner portion 238 of the release ring 234, 234' is displaced along the release member 236 in a direction generally toward the first end 258 of the cam surface 256. Thus, as the release ring 234, 234' is rotated in a direction away from the release ring locked position and to the release ring release position, the axial distance between the cam surface(s) 256 and the adjacent hole 266 decreases, as the linear distance between the first end 258 of the cam surface 256 from the adjacent hole 266 when the release ring 234, 234' is at the release ring release position can be less than the linear distance between second end 260 of the cam surface 256 from that same adjacent hole 266 when the release ring 234, 234' is at the release ring locked position. Such rotational displacement of the cam surface 258 to the release ring release position can impart a force on a release member 236 that is engaged with or otherwise coupled to the cam surface 256 that facilitates the linear displacement of the release member 236 generally in the direction of the collar 168. Moreover, such displacement of the release member 236, and the engagement or coupling of the release member 236 to the collar 168, can result in the release member 236 transmitting a generally linear force on the collar 168 that can overcome the biasing force of the collar biasing element 186, and thereby cause the collar 168 to also be linearly displaced in the same general direction as the release member 236, and moreover, displace the collar 168 to the collar release position.

Figure 15B:
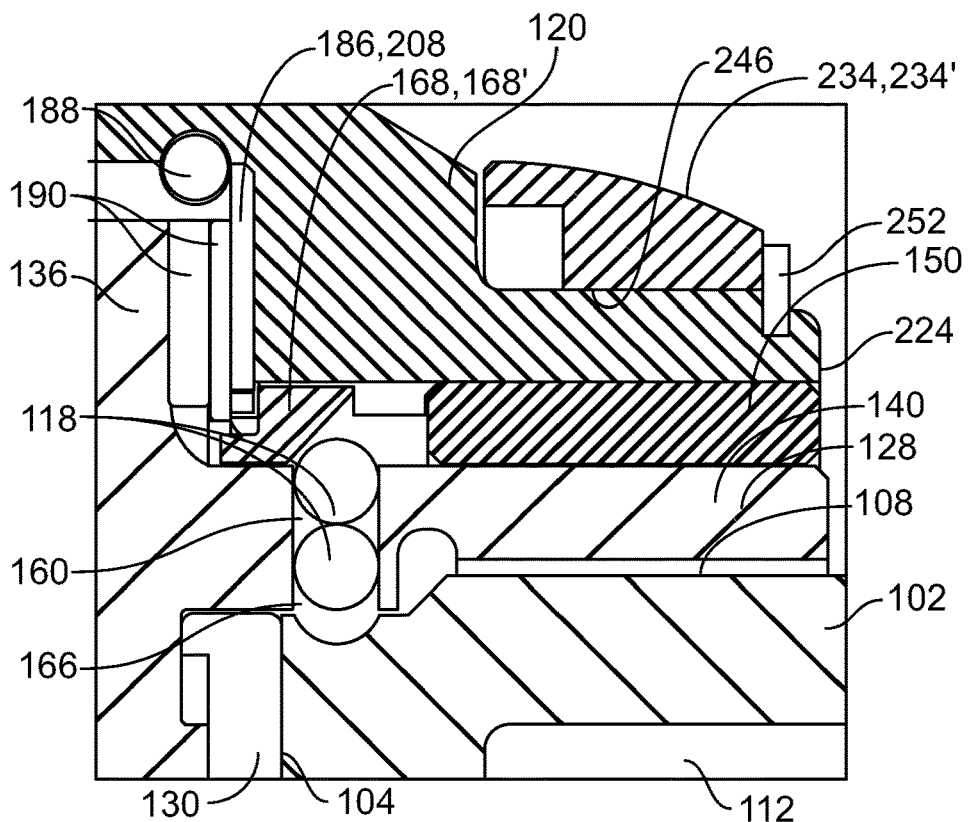
FIG. 15B illustrates a side cross sectional view of a portion of the illustrated attachment retainer in-between a locked and an unlocked position
Figure 15C:
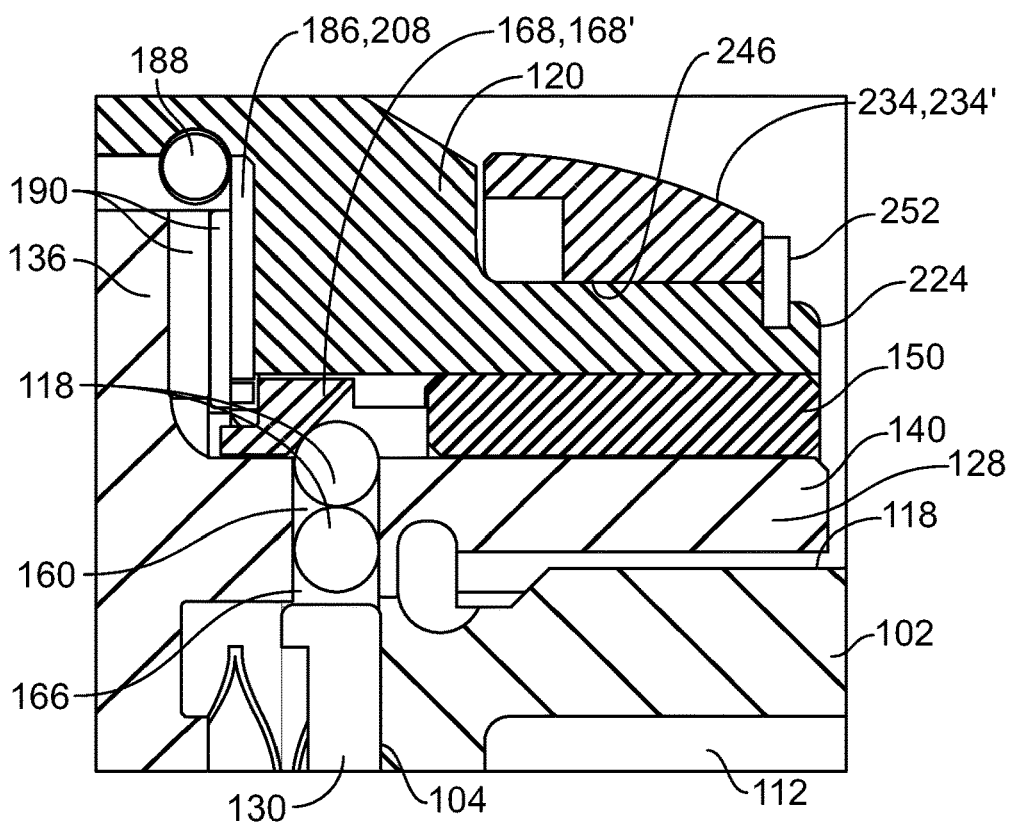
FIG. 15C illustrates a side cross sectional view of a portion of the illustrated attachment retainer in the unlocked position.

According to the illustrated embodiment, when the release assembly 126 is in the release state, the first end 258 of the cam surface 256 can generally be in contact with the release member 236, as shown for example, by FIG. 14B. Further, as previously discussed, according to the illustrated embodiment, with the release assembly 126 being rotated to its release ring release position, the associated axial displacement of the release member 236 has facilitated the axial displacement of the collar 168 to the collar release position relative to at least the spindle 128 at which the second surface 204 of the collar 168 is directly above, or adjacent to, the first opening 164 of the passageway 160 of the spindle 128, as shown in FIGS. 15B and 15C. Further, as shown by at least FIG. 15B, the shape of the second surface 204 of the collar 168, provides a degree of clearance or space above the first opening 164 of the passageway 160 of the spindle 128 that can accommodate the generally outwardly radial displacement or protrusion of at least a portion of one or more of the locking members 118 so that the locking members 118 can be removed from the groove 114 of the driven tool 102.

With the second surface 204 of the collar 168 positioned directly above, or adjacent to, the passageway 160, the driven tool 102 can be released from the attachment retainer 100 so as to be removable from the attachment retainer 100 and/or the tool housing 120. According to certain embodiments, at least the shape and/or configuration of the locking members 118 and/or groove 114 of the driven tool 102 can facilitate the outward displacement of the locking members 118 away from at least the groove 114 of the driven tool 102 during removal of the driven tool 102 from the attachment retainer 100. For example, according to certain embodiments, the locking members 118 and/or groove 114 of the driven tool 102 can have generally curved shape(s) that facilitates the driven tool 102 exerting a force against the locking members 118 that is translated into the locking members 118 being pushed out and/or away from the groove 114 as the driven tool 102 is axially displaced away from the attachment retainer 100.

According to certain embodiments, as the driven tool 102 is being removed from attachment retainer 100, the plunger biasing element 132 can exert a biasing force against the plunger 130 that pushes the plunger 130 along at least a portion of the plunger fastener 134 and from a plunger first position at which the plunger 130 is behind the driven tool 102 and linearly offset or away from the second opening 166 of the passageway 160 at least until a portion of the plunger 130 is at a second plunger position at which the plunger 130 is positioned directly beneath, or otherwise axially aligned with, a portion of the second opening 166 of the passageway 160, as shown for example, by FIG. 15C. Additionally, the biasing force of the plunger biasing element 132, and the associated force exerted by the plunger 130 onto the driven tool 102 as the driven tool 102 is being released and removed from the attachment retainer 100 can assist in pushing the driven tool 102 out from the attachment retainer 100.

According to certain embodiments, the size and/or shape of the driven tool 102 at a rear portion of the driven tool 102 behind the groove 114 and/or an outer size, such as, for example, an outer diameter, of the plunger 130, can be sized relative to the cavity 162 of the spindle 128 so as to prevent the locking members 118 from being released through the second opening 166 of the passageway 160 during the release and/or absence of the driven tool 102 from the attachment retainer 100. However, as previously discussed, including for example in connection with FIG. 5, the locking members 118 can be retained in at least the passageway 160 in a variety of other manners.

With the driven tool 102 released from the attachment retainer 100, and at least a portion of the plunger 130 positioned directly beneath, or axially aligned with, the second opening 166 of the passageway 160, a portion of the one or more locking members 118 can continue to be positioned in, or protrude into, the area, space, or clearance above the first opening 164 of the passageway 160 that is provided by the second surface 204 of the collar 168 being directly above, or adjacent to, the first opening 164. Thus, the presence of at least a portion of the locking members 118 in the area, space, or clearance above the first opening 164 of the passageway 160 can retain the collar 168 at the collar release position, at which the second surface 204, and not the first surface 202, of the collar 168 is directly above the first opening 164 of the passageway 160. Further, when the force that was provided by the operator to rotably displace the release ring 234, 234' is removed from the grip member 280 of the release ring 234, 234' the ring biasing element 270 of the release ring 234, 234' can bias the release ring 234, 234' back to the release ring locked position, wherein the cam pocket(s) 262 is/are positioned to again receive insertion of the adjacent release member(s) 236.

When a driven tool 102 is to be inserted, and locked, into the attachment retainer 100, the first engagement portion 108 of the driven tool 102 can be axially displace to be positioned to operably engage, or press, the spindle attachment portion 148 of the spindle 128. According to the illustrated embodiment, as the driven tool 102 is inserted into the attachment retainer 100, the first end 104 of the driven tool 102 can contact the plunger 130 with sufficient linear force so as to overcome the biasing force of the plunger biasing element 132, and thereby axially displace the plunger 130 along at least a position of the plunger fastener 134. According to certain embodiments, such axial displacement of the plunger and the driven tool 102 can generally continue until the groove 114 of the driven tool 102 is positioned directly beneath the second opening 166 of the passageway 160 of the spindle 128. Optionally, according to certain embodiments, the positioning of the groove 114 of the driven tool 102 directly beneath the second opening 166 of the passageway 160 of the spindle 128 will generally coincide with a stoppage in the displacement of the plunger 130, such as, for example, the plunger 130 coming into contact with the spindle 128 and/or a feature of the plunger fastener 134 that limits or stops the travel of the plunger 130 along the plunger fastener 134.

With the groove 114 of the driven tool 102 positioned directly beneath, or axially aligned with, the second opening 166 of the passageway 160 of the spindle 128, one or more of the locking members 118 can be inwardly radially displaced along at least the passageway 160 so that at least a portion of one or more of the locking members 118 enters, or protrudes, into the groove 114 in a manner that prevents, or minimizes, linear displacement of the driven tool 102 relative to the attachment retainer 100. Such displacement of the locking members 118 into at least a portion of the space provided by the groove 114 of the driven tool 102 can also be at least facilitated by the collar 168 and the collar biasing element 186. For example, the conical or tapered shaped of the second surface 204 of the inner surface 194 of the collar 168 and the biasing force of the collar biasing element 186 can create a force that, as the second surface 204 slidingly engages one or more of the locking members 118 as the collar 168 is displaced the collar release position to the collar locked position, generally pushes the locking members 118 toward the groove 114 of the driven tool 102 as the collar biasing element 186 provides a biasing force that is used to axially displace the collar 168 to the collar locked position at which the first surface 202 of the inner surface 194 of the collar 168 is directly above, or adjacent to, the first opening 164 of the passageway 160. Additionally, such linear displacement of the collar 168 to the collar locked position also facilitates the collar 168 transmitting a force onto one or more of the release members 236 that at least assists in the axial displacement of the release members 236 such that at least a portion of the release members 236 protrude into the cam pocket 262 of the release ring 234, 234', as shown, for example, in at least FIG. 14A. The associated tool can then be operated, such as, for example, by the transmission of a rotational force to the spindle 128 that can be transferred via engagement to the driven tool 102 so as to facilitate the rotation of the driven tool 102. Further, as previously discussed, with the collar 168, 168' at the collar locked position, the first surface 202 of the inner surface 194 is at a positioned relative to the first opening 164 of the passageway 164 that at least assists in retaining the locking members 118 in locking engagement with the driven tool 102 as the spindle 128, and thus the passageway 164 and locking members 118, are rotated relative to the collar 168, 168'.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. An apparatus comprising: a spindle having a cavity and a passageway, the passageway extending between a first end adjacent to an outer surface of the spindle and a second end adjacent to the cavity; a collar having an inner surface comprising a first surface and a second surface, the second surface being angularly offset from the first surface, the collar being axially displaceable about the outer surface of the spindle between a collar locked position at which at least a portion of the first surface is axially aligned with the first end of the passageway, and a collar release position at which at least a portion of the second surface is axially aligned with the first end of the passageway, and wherein the spindle is rotatable within the collar; a plunger being axially displaceable within the cavity of the spindle between a first plunger position at which the plunger is axially offset from the second end of the passageway, and a second plunger position at which at least a portion of the plunger is axially aligned with the second end of the passageway; and a plunger biasing element coupled to the plunger and structured to bias the plunger toward the second plunger position.

2. The apparatus of claim 1, further including a collar biasing element structured to bias the collar toward the collar locked position.

3. The apparatus of claim 1, wherein the passageway is sized to receive one or more locking members.

4. The apparatus of claim 3, further including a tool housing, at least a portion of the spindle and the collar housed in a cavity of the tool housing, the tool housing further having one or more recesses, and wherein the collar includes one or more protrusions outwardly extending from a body portion of the collar, each of the one or more recesses of the tool housing sized to receive placement of at least one of the one or more protrusions and to accommodate axial, but restrict rotational, displacement of the one or more protrusion within the one or more recesses.

5. The apparatus of claim 4, wherein the tool housing includes one or more holes, each of the one or more holes being in fluid communication with a recess of the one or more recesses.

6. The apparatus of claim 5, further comprising a release ring having an inner portion, the inner portion including at least one cam surface that extends between a first end and a second end, the release ring being rotably coupled to the tool housing, the release ring being selectively rotatable from a release ring locked position at which the second end of the cam surface is (a) axially aligned with a first hole of the one or more holes of the tool housing, and (b) separated from the first hole by a first axial distance, to a release ring release position at which the first end of the cam surface is (a) axially aligned with the first hole, and (b) separated from the first hole by a second axial distance that is less than the first axial distance.

7. The apparatus of claim 6, further including a release ring biasing element coupled to the release ring and the tool housing, the release ring biasing element structure to bias the release ring toward the release ring locked position.

8. The apparatus of claim 7, wherein the one or more holes are configured to receive one or more release members, the one or more release members being configured to transmit a generally linear force from the cam surface of the release ring to the one or more protrusions of the collar as the release ring is rotated from the release ring locked position to the release ring release position.

9. An apparatus comprising:
a tool housing having a housing cavity and one or more holes, the one or more holes having one or more release members;
a spindle positioned within at least a portion of the housing cavity, the spindle having a passageway;
a collar positioned about at least a portion of the spindle, the collar having an inner surface comprising a first surface and a second surface, the first surface being different than the second surface, the collar being axially displaceable about an outer surface of the spindle between a collar locked position at which at least a portion of first surface is axially aligned with a first opening of the passageway, and a collar release position at which at least a portion of the second surface is axially aligned with the first opening of the passageway, at least a portion of the collar positioned proximally adjacent to the one or more holes of the tool housing, the inner surface being sized to accommodate rotation of the spindle within the collar; and
a release ring rotably coupled to the tool housing, the release ring having a cam surface that engages the one or more release members, the cam surface structured to transmit a force that facilitates axial displacement of the one or more release members generally toward the collar as the release ring is selectively rotated from a release ring locked position to a release ring release position, the one or more release members positioned to transmit the force to the collar to facilitate axial displacement of the collar from the collar locked position to the collar release position.

10. The apparatus of claim 9, further including one or more locking members positioned within the passageway.

11. The apparatus of claim 10, wherein the second surface is configured to provide a space between the second surface and the passageway when the collar is at the collar release position that is larger than a space between the first surface and the passageway when the collar is at the collar locked position.

12. The apparatus of claim 11, further including a collar biasing element that is coupled to at least the collar, wherein the collar biasing element is structured to bias the collar to the collar locked position.

13. The apparatus of claim 12, wherein the spindle includes an internal spline structured for transmission of a rotational force.

14. The apparatus of claim 12, further including a plunger and a plunger biasing element, the plunger being axially displaced within a cavity of the spindle between a first plunger position at which the plunger is axially offset from a second opening of the passageway, and a second plunger position at which the plunger is directly below the second opening of the passageway, and wherein the plunger biasing element is structured to provide a biasing force that biases the plunger toward the second plunger position.

15. The apparatus of claim 10, wherein the passageway further includes a second opening, the second opening being adjacent to a cavity of spindle, the second opening sized to accommodate passage of only a portion, but not all, of the one or more locking members through the second opening.

16. The apparatus of claim 9, wherein the tool housing includes one or more recesses, and wherein the collar includes one or more protrusions that are housed in the one or more recesses, the one or more recesses sized to accommodate linear, and restrict rotational, displacement of the one or more protrusions within the one or more recesses, and further wherein the one or more protrusions are in engagement with at least one of the one or more release members.

* * * * *